US011644973B2

(12) United States Patent
Liu

(10) Patent No.: US 11,644,973 B2
(45) Date of Patent: May 9, 2023

(54) MULTI-PERSPECTIVE INPUT FOR COMPUTING DEVICES

(71) Applicant: Yifang Liu, Burlingame, CA (US)

(72) Inventor: Yifang Liu, Burlingame, CA (US)

( * ) Notice: Subject to any disclaimer, the term of this patent is extended or adjusted under 35 U.S.C. 154(b) by 0 days.

(21) Appl. No.: 17/694,698

(22) Filed: Mar. 15, 2022

(65) Prior Publication Data

US 2022/0197502 A1    Jun. 23, 2022

Related U.S. Application Data

(63) Continuation of application No. 16/405,867, filed on May 7, 2019, now Pat. No. 11,281,373.

(51) Int. Cl.
*G06F 3/04886* (2022.01)
*G06F 3/0482* (2013.01)
*G06F 3/041* (2006.01)

(52) U.S. Cl.
CPC ........ *G06F 3/04886* (2013.01); *G06F 3/0416* (2013.01); *G06F 3/0482* (2013.01); *G06F 2203/04104* (2013.01)

(58) Field of Classification Search
CPC .. G06F 3/04886; G06F 3/0482; G06F 3/0416; G06F 2203/04104; G06F 2203/0339; G06F 2203/04808; G06F 1/1626; G06F 1/169
See application file for complete search history.

(56) References Cited

U.S. PATENT DOCUMENTS

| | | | | |
|---|---|---|---|---|
| 2008/0098331 | A1* | 4/2008 | Novick | G06F 3/04886 715/835 |
| 2011/0009195 | A1* | 1/2011 | Porwal | A63F 13/533 463/37 |
| 2013/0237322 | A1* | 9/2013 | Sobel | G06F 3/033 463/37 |
| 2016/0162098 | A1* | 6/2016 | Kim | G06F 3/041 345/174 |

* cited by examiner

*Primary Examiner* — Abhishek Sarma
(74) *Attorney, Agent, or Firm* — Brad Bertoglio; Intelink Law Group, P.C.

(57) ABSTRACT

An electronic device, which may be handheld, is provided with a touch sensor and display screen. The display screen may be on a front surface of the device, and the touch sensor may be on a rear surface. Virtual keyboard key contact areas are responsive to user touch inputs, without providing any visual indicia on the display screen indicative of the positions associated with the key contact areas. Key contact area positions can be dynamically adjusted in response to locations on the touch sensitive input surface of user touch inputs.

16 Claims, 19 Drawing Sheets

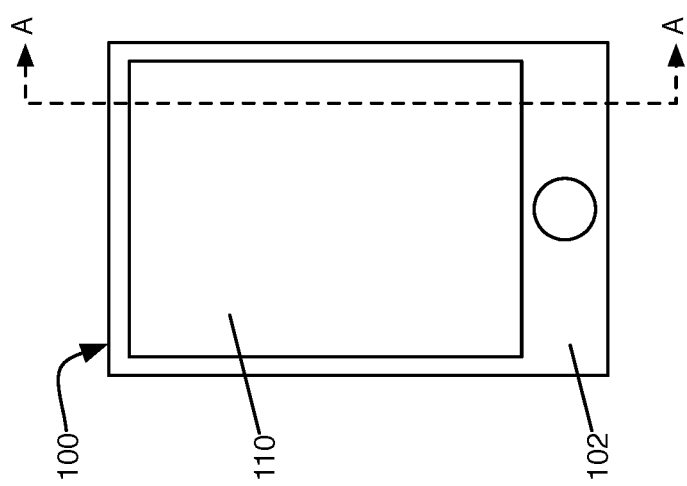
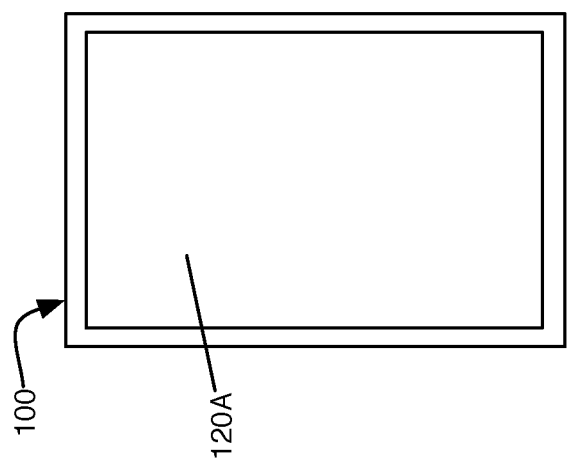
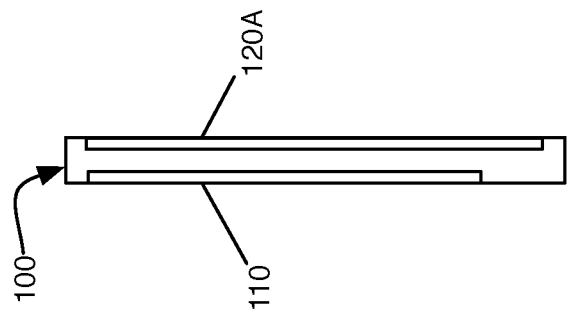

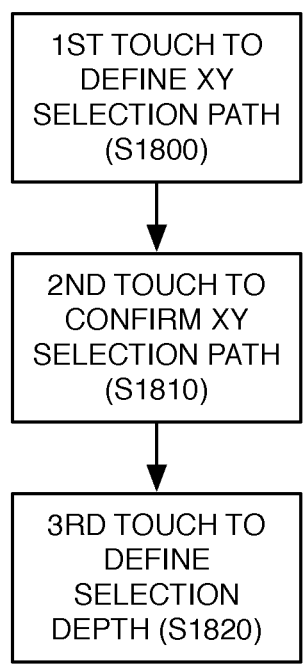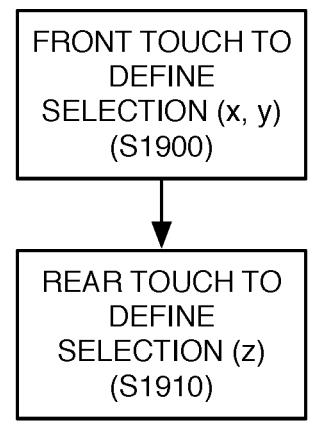
FIG. 18
FIG. 19

MULTI-PERSPECTIVE INPUT FOR COMPUTING DEVICES

RELATED APPLICATIONS AND CLAIM OF PRIORITY

This patent application is a continuation of, and claims the benefit of, U.S. patent application Ser. No. 16/405,867 filed on May 7, 2019 and titled "Multi-Perspective Input For Computing Devices".

BACKGROUND

As computing devices, especially mobile computing devices, become ubiquitous in modern life, touch-based input mechanisms have gained vast population as a human-computer interface. With conventional haptic electronic device input modalities, users select an input device location by directly touching portions of an input device, such as a touch sensitive display panel, at which selection is desired. For example, if the user wants to manipulate a graphical object on a touch sensitive display, one or more of the user's finger would touch the particular locations on the display corresponding to the graphical object.

However, one disadvantage of such direct-on-object touch input is blocking the user's view of the objects to be manipulated, when the user tries to select the objects by touching the screen. Thus, in some cases the touch input signals are not created accurately, especially when the object on the display is relatively small such that the user's finger completely or partially blocks the user's view of the object. Another disadvantage of the direct-on-object touch input is the inefficiency of input. Normally, with direct-on-object touch input, it is convenient for at most two fingers to make touch inputs on the display. Such two-finger input may limit the speed of user interaction, especially for inputs in character typing.

SUMMARY

Methods and apparatuses for providing interaction between a computing device and a device user are disclosed. Multiple touch-sensitive and/or pressure-sensitive surfaces may be provided on various external surfaces of a computing device, such as a smartphone, tablet or other type of handheld computing device. A touch-sensitive display screen may be set within a front surface of the device, while a rear auxiliary touch-sensitive surface sensor may be positioned on a rear surface of the device for identifying one or more points of haptic contact, preferably in at least two dimensions. One or more side surfaces of the device may also include a touch-sensitive surface sensor operable to identify one or more positions of haptic contact along a range of contact points in at least one dimension. A microprocessor may receive signals indicative of haptic contact engagement occurrences and positions from each of the front display screen the rear auxiliary touch-sensitive surface sensor and the side auxiliary touch-sensitive surface sensors. Such signals may then be applied as user interaction inputs to an operating system and/or application software implemented by the microprocessor. In some embodiments, the side surfaces may be linear sensors, rather than sensors providing haptic contact information within a two-dimensional range. In some embodiments, side sensors on opposing sides may detect pressure, such that a user squeezing the device (e.g. causing a simultaneous increase in pressure applied to opposing side sensors) may be detected as an interaction input. The rear sensor may be integrated into a rear display, and/or side sensors may include an illuminating panel with a state of illumination controlled by haptic contacts with the sensor.

In accordance with another aspect, a touch-sensitive rear surface of a handheld electronic device may be beneficially utilized as a keyboard for user input, thereby potentially providing more front display screen space for application content or the like. The handheld electronic device may be held with thumbs on front display and multiple fingers proximate a rear surface of the device. A plurality of haptic targets may be activated on the rear touch-sensitive sensor, each haptic target associated with a corresponding input event, such as a keyboard key. The device may then detect a contact with a haptic target, and respond to a corresponding input event by the device processor within the handheld electronic device. During such a mode of operation, providing for rear-surface keyboard input, indicia of haptic targets may be selectively displayed on the front display screen, potentially by superimposing the indicia over display content otherwise occupying the display screen, whereby a user may be provided with guidance for use. Such indicia of haptic targets may be triggered in response to satisfaction of one or more indicia display criteria, which may be at least in part software-determined based on, e.g., OS state and application state, and/or user-determined criteria (e.g. physical orientation of the device, or finger positioning). The indicia of haptic targets may optionally include a visual indication of rear surface user contact points, further guiding the user's use of the rear input mechanism. In yet other embodiments, a rear sensor may be used as a trackpad, to which a user may apply gestures to interact with content displayed on the front display panel (e.g. to move a cursor or selection arrow).

The multiple input surfaces described herein may be effectively employed to interact with object representations rendered in three or more dimensions in a scene. First, a selected object representation may be selected from amongst multiple object representations rendered in a scene on a display screen (which may be, e.g., directly integrated with the handheld electronic device, or part of a separate system (e.g. computer workstation) for which the handheld electronic device may be used to interact. The object representation may be selected by using a sequence of haptic contacts with multiple surface sensors. A selection path may be specified, e.g. by tapping a position on a front display to confirm an (x, y) coordinate associated with the path, and tapping the rear display to confirm the selected (x, y) coordinate for the path end point and/or confirming the prior selection. Another haptic contact may be utilized to select a selection point along the selection path at which the desired object representation exists. Once the object representation is selected, the user may act upon it via further haptic contacts with two or more of the touch-sensitive sensors. Examples of such actions include rotation and/or translation. The scene rendering perspective may also be altered during interaction by the user.

According to yet another aspect of certain embodiments, contacts with a surface touch-sensor may be dynamically mapped to triggerable events. In particular, an event associated with a haptic contact may be based on one or more spatial properties of the haptic contact relative to other haptic contacts. Such spatial properties may include a position of haptic contact relative to other haptic contacts by the user on a particular sensor. In particular, triggering an event may include correlating a spatial relationship between haptic contacts to a spatial relationship between selectable elements. Spatial properties that may be used to trigger events and/or select event types from amongst multiple event types further include a shape of contact area, an orientation of contact area and/or a trajectory of contact movement. In some embodiments, dynamic mapping of haptic contacts to trigger events may be performed by a handheld electronic device microprocessor implementing operating system software. In other embodiments, dynamic mapping of haptic contacts to trigger events may be performed by a handheld electronic device microprocessor implementing application software. Triggering an event may include correlating a spatial relationship between haptic contacts with one or more touch-sensitive sensors to a spatial relationship between selectable elements rendered on a display screen, which may be a display screen disposed within the handheld electronic device or a display screen within a second computing device (such as a PC, computer workstation or gaming system) that is in operable communication with the handheld electronic device. Triggered events may be selected from amongst a plurality of event types based on, e.g., one or more of: a sequence of haptic contacts with one or more touch-sensitive sensors (whether implemented as independent sensors or forming a continuous sensor surface wrapping around the handheld electronic device); manipulation of one or more objects rendered in three or more dimensions using a sequence of haptic contacts; or detection of an orientation of the handheld electronic device, such as via an inertial measurement unit or other orientation sensor.

In accordance with yet other aspects of the disclosure, haptic contacts on a touch-sensitive surface sensor may be dynamically grouped. Multiple haptic contacts may be clustered into contact groups, such as via nearest neighbor analysis or clustering techniques such as density-based clustering. Each contact may then be associated with a contact group, with the associated contact group potentially utilized to characterize input events associated with the haptic contacts. Haptic contacts may also be translated spatially relative to a touch-sensitive surface sensor, based on an angle of orientation associated with the contacts. For example, a reference path (such as a line or curve of best fit) may be determined for a group of contacts. An angle of orientation of the reference path relative to the electronic device (e.g. the touch-sensitive surface sensor) may be calculated, and then utilized to translate contact positions associated with haptic contacts. Multiple haptic contacts may also be converted to vary an input parameter. In some embodiments, contact locations may be determined for a reference haptic contact and a control haptic contact. A reference path on the touch-sensitive surface sensor can be calculated based on contact locations of the reference haptic contact and control haptic contact. An associated input parameter may then be determined based on a location of the control haptic contact relative to the reference path.

Various other objects, features, aspects, and advantages of the present invention and embodiments will become more apparent from the following detailed description of preferred embodiments, along with the accompanying drawings in which like numerals represent like components.

BRIEF DESCRIPTION OF THE DRAWINGS

FIG. 1 is front view of a computing device with multi-surface touch input.

FIG. 2 is a rear view of the computing device.

FIG. 3 is a schematic cross-section A-A of the computing device.

FIG. 18 is a first process for selecting an object within a three-dimensional scene.

FIG. 19 is a second process for selecting an object within a three-dimensional scene.

DETAILED DESCRIPTION

Figure 5:
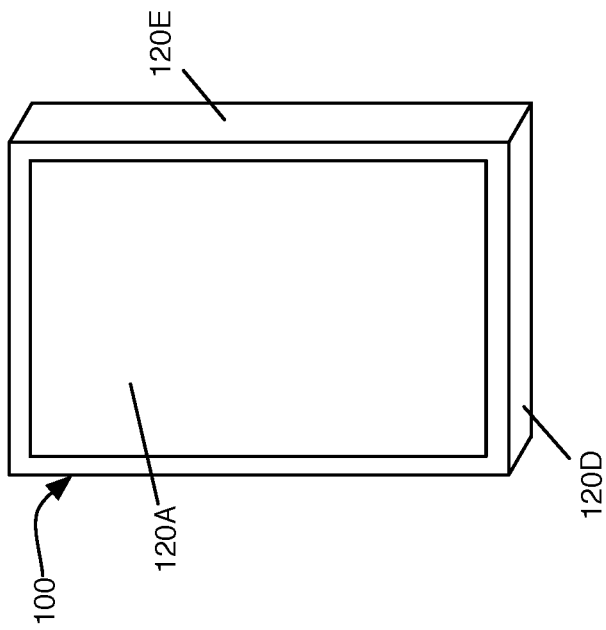
FIG. 5 is a rear lower perspective view of the computing device.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

In existing human-computer interaction mechanisms that are based on use of a touch-sensitive display screen, the dominant mechanism of user input is haptic, such as user touch on a touch sensitive screen on the front of a computing device. Software-defined input mechanisms, such as a touch-active virtual keyboard, are typically displayed on the screen in a manner such that, for many device types such as smartphones and tablets, the input mechanisms occupy a large portion of the limited screen territory, which is already often constrained for displaying application data even without a virtual keyboard occupying a significant portion of the screen. Also, because the majority of user inputs typically come through the screen on the front of a computing device that the user may be holding, most of the user's fingers are not positioned appropriately for inputting data, due to the human hands' physical topology when holding the computing device facing the user. For example, common device holding techniques may leave only a user's thumbs positioned against the front device display, with the remaining fingers all contacting the device back side or other surfaces.

Such factors hinder the efficiency of user input, and in many cases bring inconvenience to the handling of and inputting to the device. Haptic user input mechanisms on a device's front display screen may also expose the user's inputs to observation by other people in sight range of the computing device, which may be undesirable in some circumstances.

For these and other reasons, it may be desirable to support multiple surfaces providing touch-based user input on a computing device, particularly a handheld personal electronic device such as a smartphone or tablet. Input from touch sensors in or on the multiple input surfaces may be utilized by operating system and/or application software such that inputs sources interact and/or communicate with each other, to enable sophisticated, multi-dimensional user input functionalities.

An exemplary device is illustrated in FIGS. 1-5. FIG. 1 is a front view of personal electronic device (PED) 100, illustrated schematically. Front surface 102 includes touch-sensitive display screen 110 set therein. PED 100 may further include one or more auxiliary input surfaces 120, each responsive to haptic input such as user touch. In the embodiment of FIGS. 1-5, auxiliary input surfaces 120 are placed on various surfaces of PED 100. FIG. 2 is a rear view of smartphone 100, illustrating rear or back side touch-sensitive surface sensor 120A. FIG. 3 is cross-section A-A, illustrated schematically, showing front display screen 110 and rear touch-sensitive surface sensor 120A. FIG. 3 and certain other figures may be simplified for illustration. It is contemplated and understood that references herein to a sensor being "on," "mounted on" or "set within" a surface of PED 100 shall mean that the sensor is able to detect the occurrence of haptic contact and determine information concerning the position of that contact relative to a particular PED surface; in typical embodiments, such sensors may be implemented as part of a structure that includes protective shielding (e.g. mounted behind one or more layers of glass, plastic or other material) and the sensor need not be directly and externally exposed on the PED surface.

Figure 4:
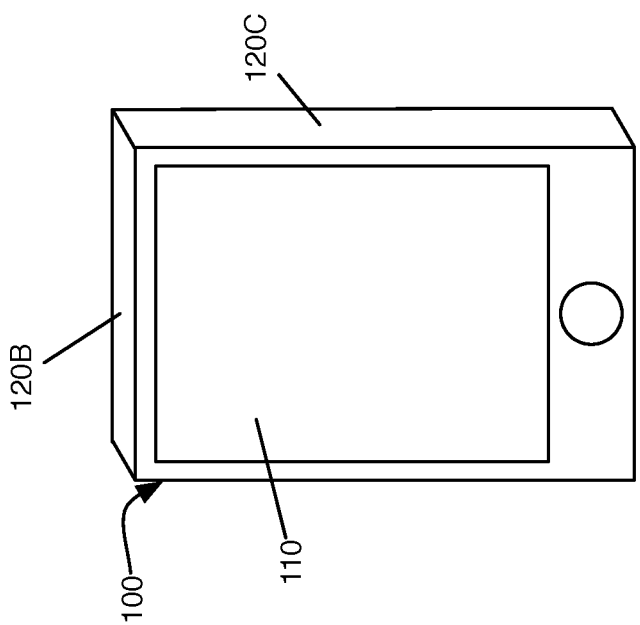
FIG. 4 is a front upper perspective view of the computing device.

Other auxiliary haptic input mechanisms, such as touch-sensitive side surface sensors, are also implemented in PED 100. FIG. 4 is a top front perspective view of PED 100, illustrating top surface auxiliary touch-sensitive surface sensor 120B spanning a top side of PED 100, along with right side auxiliary touch-sensitive surface sensor 120C, spanning a right side of PED 100. FIG. 5 is a bottom rear perspective view of PED 100, illustrating left side auxiliary input surface 120E and bottom side auxiliary input surface 120D.

While PED 100 may be illustrated in some embodiments to have touch-sensitive and/or pressure-sensitive sensors implemented as device components integrated directly within the PED 100 computing device itself, it is also contemplated and understood that in other embodiments, such surface sensors can be implemented as external auxiliary components that may be attached to PED 100. An example of such an implementation is a protective case that may be installed on a smartphone, having touch-sensors built into its back and/or side surfaces and in operable communication with inputs to microprocessor 130 to pass on information descriptive of haptic contacts received on such external case sensors.

While PED 100 is illustrated in FIGS. 3-5 as a smartphone with conventional tablet-style form factor, it is contemplated and understood that in other embodiments, the uses of multiple input surfaces described herein may be readily applied to different types of devices and different form factors. In some such embodiments, references to the relative position or orientation of surfaces on such devices may vary during use. For example, in embodiments featuring a clamshell style electronic device (such as a hinged or folding phone), portions of a "front" touch-sensitive surface sensor may in fact face rearwards during some modes of use. A "rear" touch-sensitive surface sensor may face inwards when such a device is folded around it. Similarly, a "top" side surface sensor may face upwards during some modes of use (e.g. when a tablet with horizontal folding centerline is used in an open configuration) and downwards in other modes of use (e.g. when a tablet with horizontal folding centerline is used in a folded configuration). References to surface positioning here are intended to be relative to a particular mode of use and to distinguish one surface from another, and should not be deemed to exclude configurations in which relative surface positioning may vary across modes of use, unless such an exclusion is explicitly stated.

Figure 6:
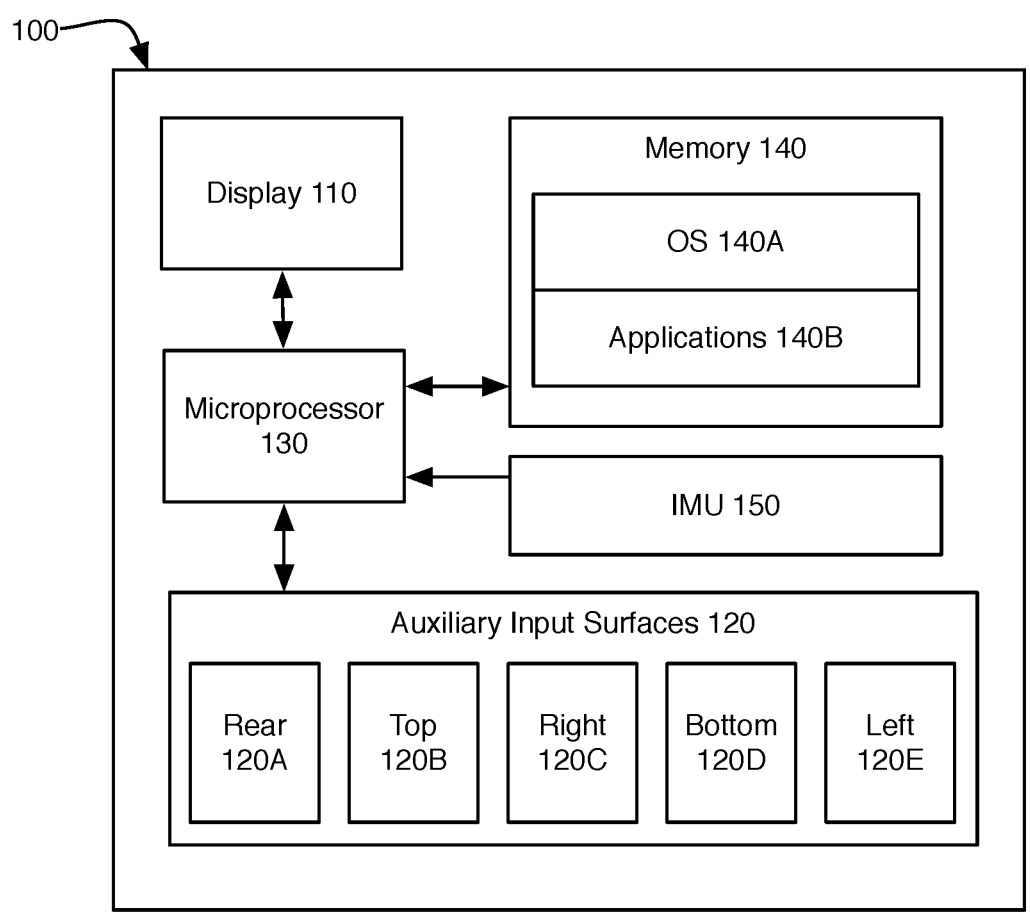
FIG. 6 is a schematic block diagram of the computing device.

FIG. 6 is a schematic block diagram of PED 100. PED 100 includes microprocessor 130, implementing software stored in memory 140, such as operating system 140A and application software 140B. Memory 140 may be or include a non-transitory computer readable storage medium, impressed with or containing computer program instructions which, when executed on microprocessor 130, cause PED 100 to implement methods and operations described herein. Touch-sensitive primary display 110 interacts with microprocessor 130; for example, microprocessor 130 may drive a graphic display panel integrated within display 110, while display 110 may transmit signals indicative of haptic contact (i.e. touch occurrences and touch position on the sensor/display 110), to microprocessor 130. Such haptic contact or touch position information may then be applied as a source of user interaction inputs to software implemented by microprocessor 130, such as OS 140A and/or applications 140B. Similarly, auxiliary touch-sensitive input sensors 120 also provide signals indicative of haptic contact (e.g. engagement occurrences and touch position on the sensor) to microprocessor 130, for implementation as user interaction inputs for OS 140A and/or applications 140B. Inertial measurement unit (IMU) 150 may be utilized (amongst other things) as an orientation sensor, providing information concerning the orientation of computing device 100, such that, amongst other things, OS 140A may, when implemented by microprocessor 130, determine whether computing device 100 is being held in a landscape or portrait orientation.

While the embodiment illustrated in FIGS. 1-5 provides a primary display input surface and five auxiliary input surfaces on other sides of PED 100, it is contemplated and understood that in other embodiments, any combination of one or more auxiliary input surfaces 120 may be utilized, with varying placement. For example, in some embodiments, two input surfaces will be provided: a front surface touch-sensitive display, and a rear surface touch sensor.

Touch sensors of the type used on typical front-side touch sensitive displays for personal electronic devices typically track one or more spatial properties of haptic contact, such as finger positioning in two dimensions. However, additional or alternative spatial properties may be determined (e.g. by OS 140A and/or application 140B), via characterization of an area of contact with a touch sensor. By evaluating an area of contact, additional spatial properties other than a center or intended point of contact may be determined. For example, some touch sensors additionally may detect absolute or relative amounts of pressure applied while touching the sensor (either measuring pressure directly, or by evaluating spatial properties such as the shape of a contact caused by deformation of a user's finger over a two-dimensional plane). Other spatial properties that may be detected by some touch sensors include an orientation of contact area. For instance, a contact area may be characterized with a length and width. Characterization of oval or oblong shapes may be utilized to distinguish between a user pressing down directly with a finger tip, versus laying the length of a finger across a sensor to form an elongated contact area. The orientation of an oval or oblong contact area (i.e. the contact area's major axis) in turn may provide an indication of the direction of a user's finger relative to the touch sensor, and thus, the orientation in which a user is holding device 100. Yet another spatial property of a haptic contact that may be characterized in some embodiments is a trajectory of contact movement. A device operating system may analyze these and other spatial properties of a haptic contact to pass interpreted haptic contact information to an application program as user input events.

In some embodiments, one or more of auxiliary surface sensors 120 may include a linear sensor, rather than a two-dimensional sensor. A linear sensor may be particularly beneficial for implementation along the side edges of a generally thin device, such as top input surface 120B, right input surface 120C, bottom input surface 120D and left input surface 120E, when implemented in a smartphone or tablet embodiment. In some such embodiments, with available surface area limiting the extent to which meaningful two-dimensional input can be detected, linear sensors may be more easily used by a user, with less opportunity for unintended sensor output. For example, a user can slide a finger along an edge of PED 100 to provide a linear input signal, without worrying whether the finger is simultaneously drifting towards the front or rear of the device. Such a sensor may output an indication of one or more positions of haptic contact with the sensor along a single dimension, for example, identifying a contact point along a range of contact points extending along some or all of a device side surface.

In some embodiments, one or more of auxiliary input sensors 120 may utilize pressure sensors, in addition to or in lieu of touch position sensors. For example, in some embodiments of PED 100, it may be desirable to implement edge-mounted auxiliary sensors 120B, 120C, 120D and 120E as pressure sensors only, while implementing rear auxiliary sensor 120A as a two-dimensional touch position sensor, and implementing front display 110 as a pressure-sensitive two-dimensional touch position sensor. Thus, front display 110 and rear sensor 120A may together provide multiple touch position inputs to microprocessor 130 (and thus OS 140A and application software 140B), while side surface pressure sensors 140B-E may provide inputs to microprocessor 130 enabling detection of an event when a user squeezes PED 100 (such as when auxiliary input pressure sensors on opposite sides of PED 100 detect a simultaneous increase in pressure, potentially also exceeding a threshold level).

In some embodiments, auxiliary input surfaces 120 may further include visual display panels, such as raster image displays similar to front display 110 which may be implemented using LED, OLED, AMOLED or other comparable display technologies. In particular, rear input surface 120A may be particularly beneficially implemented as a touch sensitive display, given the relatively large surface area available. In some embodiments, auxiliary input surface sensors may include other visual display mechanisms, such as an illuminating panel, preferably having a variable state of illumination determined at least in part by haptic contacts with the sensor. For example, a pressure-sensitive side surface sensor may illuminate when a threshold level of pressure is applied to it, and/or cease illumination when a level of applied pressure falls below a threshold level, thereby providing visual feedback reinforcing the pressure-based side surface input detected by PED 100.

In some embodiments, other touch-based input devices may be utilized on one or more auxiliary input surfaces 120, such as buttons, keys or keyboards, trackpads, and the like.

Various embodiments utilizing multiple surfaces for touch-based input may include one or more of: (1) reduced likelihood of touch input error due to, for example, decreased spatial density of touch input indicia; (2) increased speed and efficiency of typing and other types of touch input; (3) freeing up precious screen territory on a primary display screen, which otherwise may be occupied by on-screen touch keyboard or other software-defined touch input indicia when the active application needs input; (4) avoid blocking the user's view of the data displayed on the screen; (5) accurate and affirmative touch-based object or text selection; (6) providing new or additional dimensions of touch-sensitive and/or pressure-sensitive inputs on one or more surfaces of a device, which enable new types of control on displayed and/or display perspectives objects and/or display environments; (7) providing new or additional dimensions of touch-sensitive and/or pressure-sensitive inputs on one or more surfaces of a device, which enable multiple input modes, and support natural switching amongst multiple input modes; (8) much better support for single-handed modes of device handling and user inputting; (9) providing privacy protection when authentication input is provided by typing and/or hand gestures on the rear surface underneath the device, which is typically not visible to others in the proximity of a device user, rather than on the front surface of the device which may be easily visible to others.

Exemplary modes of use for multi-surface touch input may be understood in connection with the following embodiments:

Ten-Finger Keyboard on the Rear Surface on the Back of a Computing Device.

Figure 7:
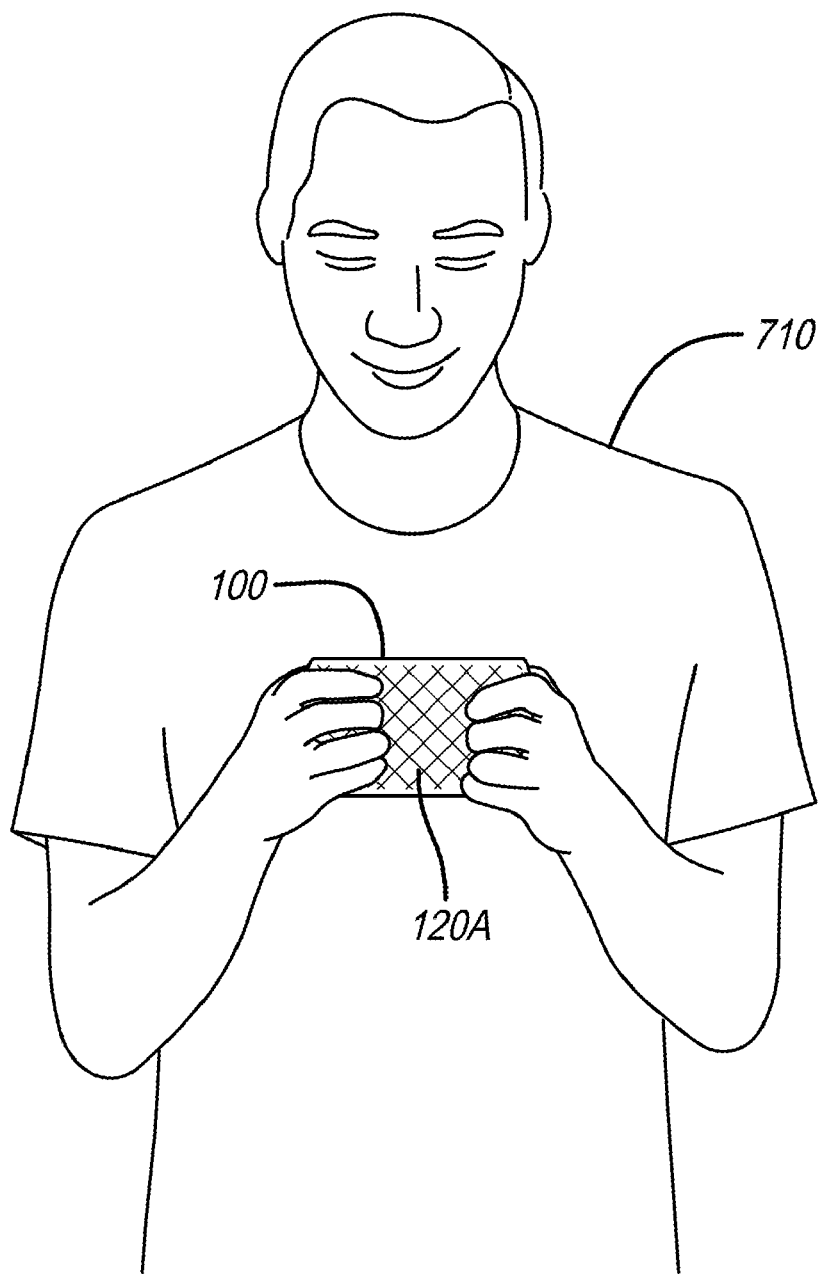
FIG. 7 is a perspective view of a user holding the computing device for multi-surface text input.

FIG. 7 illustrates one embodiment of a computing device enabling ten-finger input by a human with a handheld electronic device, illustrated with a form factor that is generally flat and rectangular in shape. Computing device 100 can be held in the hands of user 710 in a landscape orientation. User 710's thumbs can be used to provide input on the front surface 110 of computing device 100, while user 710's other fingers can naturally rest and/or tap on the rear surface 120A of the computing device, which may implement a keyboard input mechanism. In some embodiments, rear surface 120A may provide a touch-sensitive display panel, implementing a software-defined keyboard for user input and optionally displaying haptic finger targets. In other embodiments, rear surface 120A may provide a touch-sensitive panel surface without a display, optionally including printed indicia indicating target input areas which the user may utilize for guidance of haptic input as needed. In yet other embodiments, physical keys may be provided on rear surface 120A.

One potential challenge with use of rear surface 120A for keyboard input may be providing users with visual cues to indicate correspondence between haptic targets (i.e. touch locations) and a corresponding character or event for input. Even if visual indicia are provided on rear surface 120A (whether permanently printed, or software-defined using a rear surface display panel), a user 710 may not be able to easily observe rear surface 120A during use. However, software-defined input indicia may be selectively displayed on front display panel 110, preferably overlaid or superimposed onto display content otherwise being shown on display panel 110 by a current application, in order to provide a user with visual cues facilitating input on rear surface 120A. Preferably, such visual cues can be displayed on demand, providing a user with guidance when desired to enable targeting of desired characters for entry or other input events, without otherwise disrupting the user's perception of the primary display content.

Figure 8:
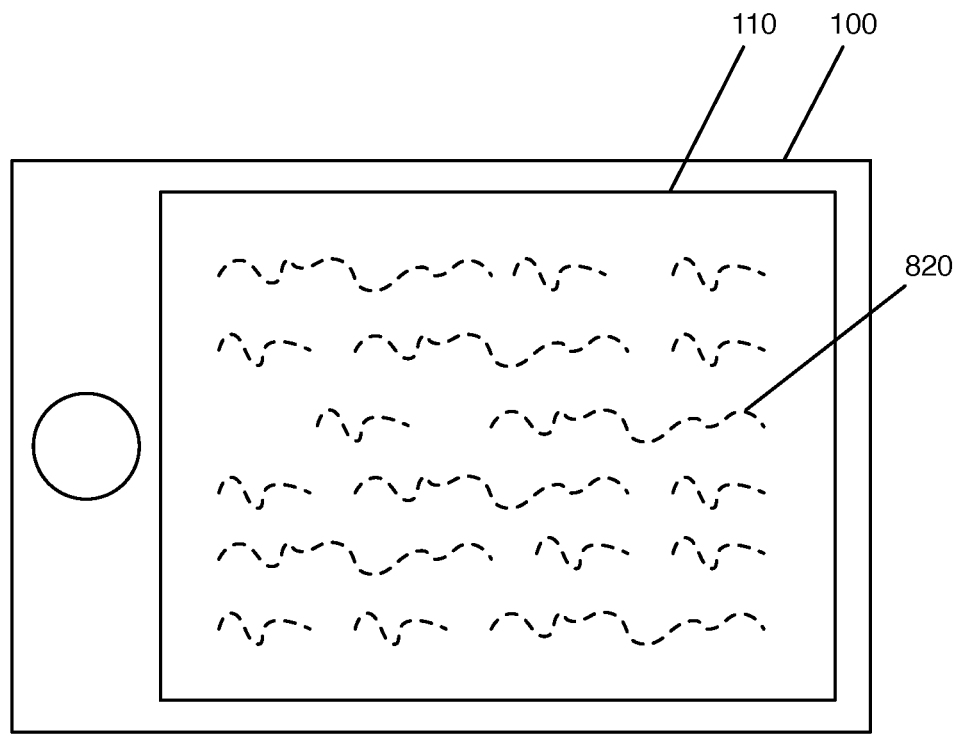
FIG. 8 is a front view of the computing device during a state in which rear surface input visual cues are not displayed.
Figure 9:
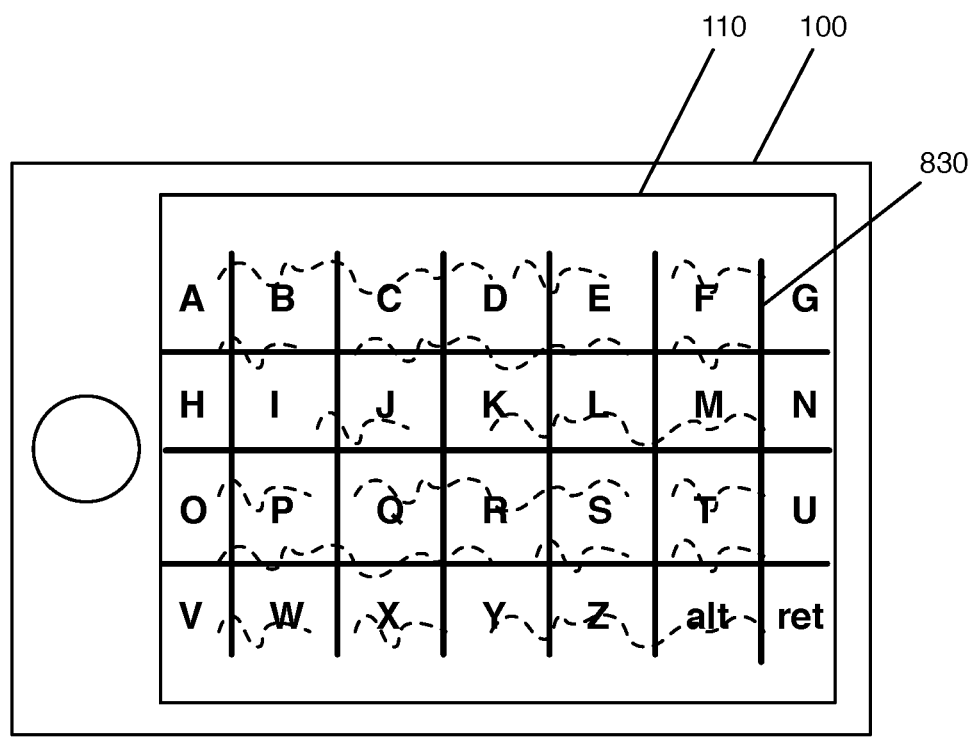
FIG. 9 is a front view of the computing device during a state in which rear surface input visual cues are overlaid onto a front display.
Figure 10:
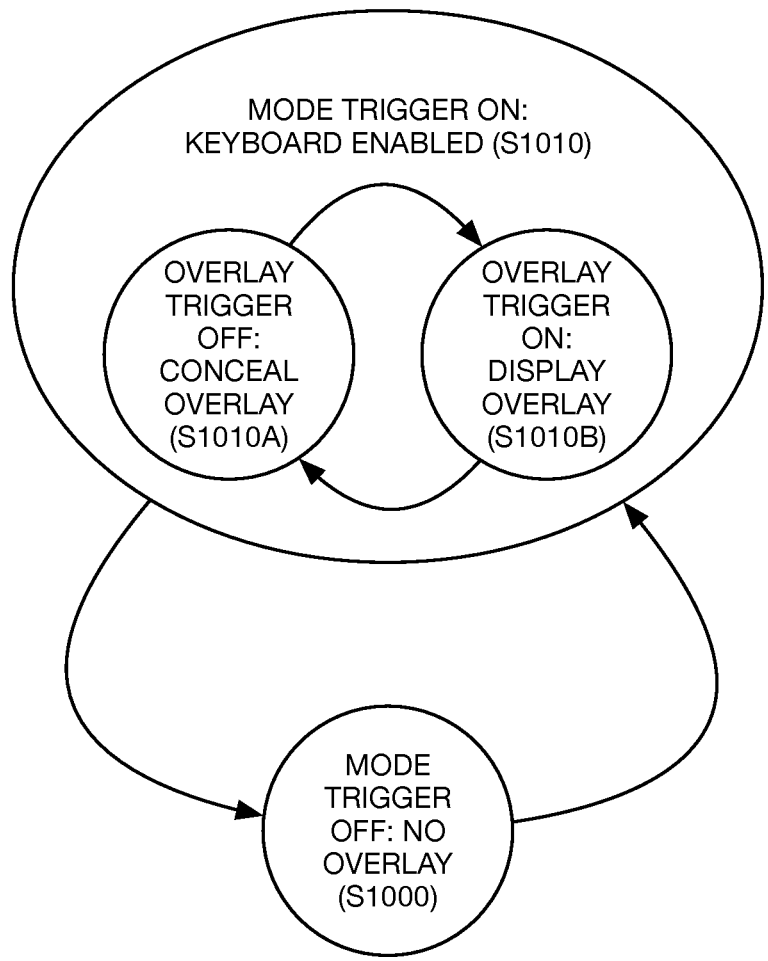
FIG. 10 is a state diagram for controlling the display of rear surface input visual cues on the front display.

FIGS. 8-10 illustrate an exemplary implementation of a variable front surface display providing a user with easily-viewable indicia of rear surface input locations. In particular, FIG. 8 is a front view of computing device 100, having front display 110 rendering application data 820 during normal use. FIG. 9 is a front view of computing device 100, upon triggering of a display overlay 830 providing a user with visual cues as to the significance of various locations on a rear panel touch surface.

FIG. 10 is a state diagram illustrating the operation of overlay 830. During an initial state S1000, a visual cue trigger is in an OFF or untriggered state, such that front display visual cue overlay 830 is not displayed, as illustrated in FIG. 8. Optionally, a first trigger must be satisfied to place computing device 800 into a mode of operation for accepting of rear surface input. Such a first trigger, to enable the mode of operation, may be comprised of one or more criteria, which may include various combinations of user-determined and/or software-determined criteria. For example, software-determined triggers may include criteria such as OS 140A enabling a rear surface keyboard, and/or a current application 140B being in a state in which it accepts keyboard input. An exemplary user-determined trigger criterium may include a combination of sensor states indicative of desired rear keyboard operation, such as: (1) holding of computing device 100 in a particular physical orientation (e.g. landscape orientation or portrait orientation), and/or (2) application of a threshold level of pressure or contact to both top input surface 120B (facing towards the right, in the orientation of FIG. 8) and bottom input surface 120C (facing towards the left, in the orientation of FIG. 8), and/or (3) a particular auxiliary input surface state of user input, such as resting of four fingers on each side of rear surface touch sensor 120A.

If mode trigger criteria are satisfied, computing device 800 enters state S1010, in which a rear surface input location overlay may be alternatively displayed or concealed to guide the user in using a rear surface touch sensor for input. Indicia display criteria may also include various combinations of software-determined criteria and user-determined criteria. For example, in some embodiments, when a device is in a mode of operation enabling rear-surface keyboard input, it may be desirable to display rear input overlay 830 when a user lightly rests four fingers on each side of rear surface input 120A (state S100B, resulting in a display such as that of FIG. 9), and stop or conceal the display of rear input overlay 830 when a user rests fewer than four fingers on each side of rear surface input 120A (state 1010A, returning the device display to that shown in FIG. 8).

In some embodiments, display overlay 830 may further include a visual indication of the touch location of each finger on rear surface input 120A. For example, a keyboard display may only render the characters at locations corresponding to the user's fingers on rear surface 120A. Alternatively, a keyboard display may visually highlight or emphasize characters corresponding to touch locations of each finger on rear surface 120A (e.g. by semi-transparent color block, or by changing the appearance of characters corresponding to touch locations such as by bolding or decreasing transparency).

Multi-Finger Gesture-Enabled Trackpad on the Rear Surface on the Back of a Computing Device:

In this input mode, the user can use the touch-sensing and/or pressure-sensing rear surface 120A on the back of the computing device as a trackpad, which accepts all kinds of pointing inputs and gesture inputs, such as pointing, tapping, pressing, swiping, and other gestures that involve one or more fingers.

Figure 11:
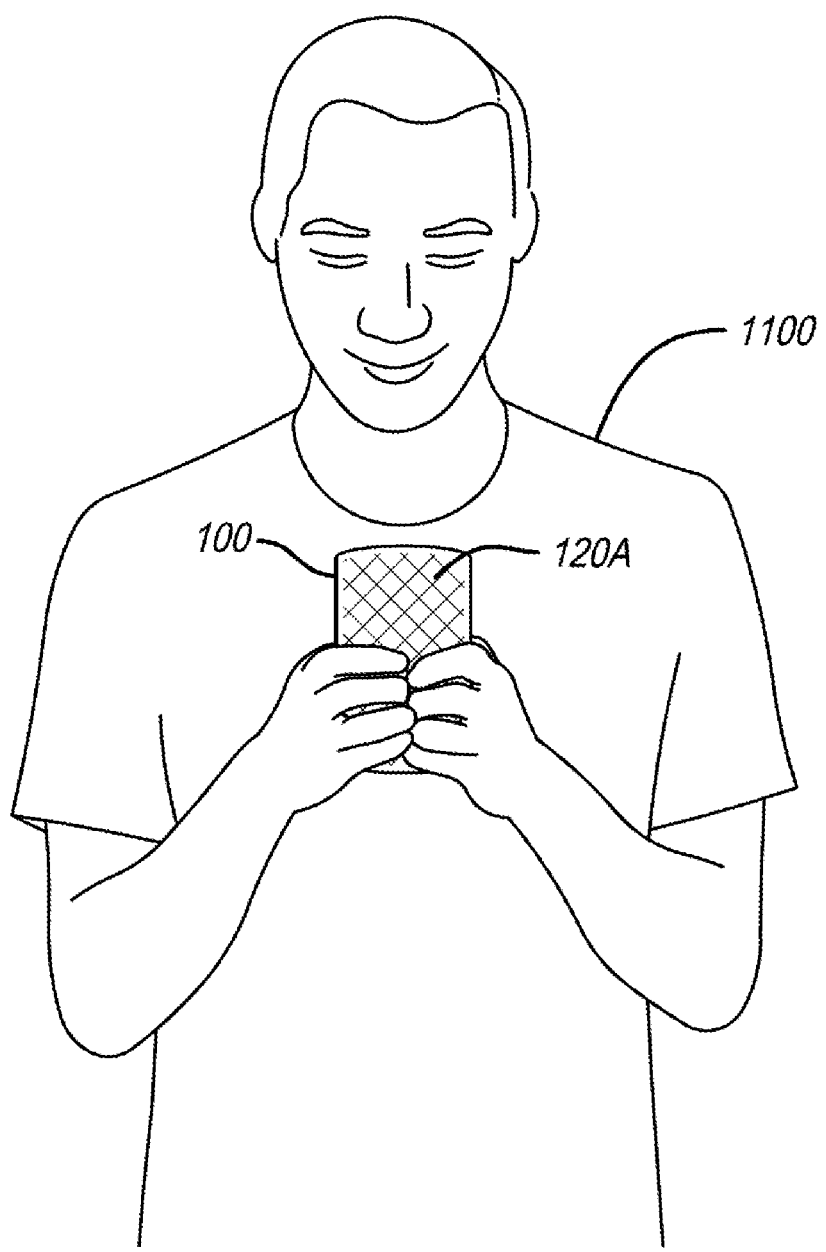
FIG. 11 is a perspective view of a user holding the computing device for use of a rear surface trackpad input.
Figure 12:
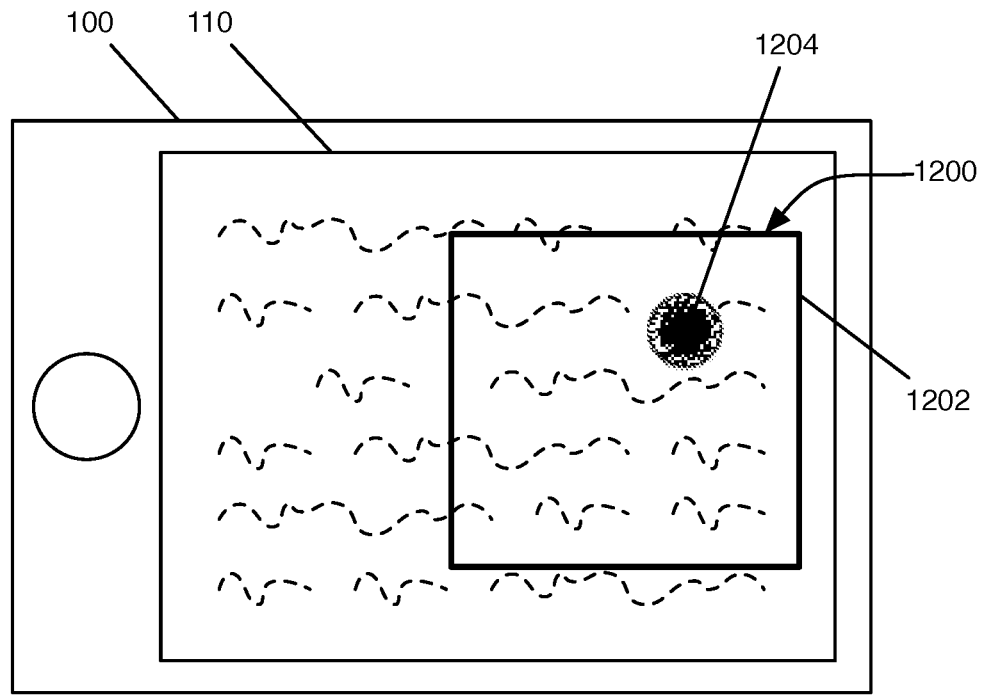
FIG. 12 is a front view of the computing device displaying visual cues for use of a rear surface trackpad input.

In this input mode, the computing device can be held by the user in either landscape orientation (as in the input mode above) or portrait orientation. For example, FIG. 11 illustrates a user 1100 holding computing device 100 in a portrait orientation, using rear surface 120A as a track pad input. Implementation of the trackpad may be analogous to the rear keyboard mechanism described above, e.g. in the state diagram of FIG. 10. For example, initial criteria may be required to place the computing device into a mode of operation enabling track pad input, such as enabling of a track pad within OS 140A and activation of track pad input by a current application 140B executing by PED 100. Other criteria may trigger a front display overlay or guide providing a user with visual feedback on use of the trackpad input mechanism. FIG. 12 illustrates an exemplary overlay 1200 on front display 110 of computing device 100, illustrating track pad boundaries 1202 and a user's current finger position 1204.

Figure 13A:
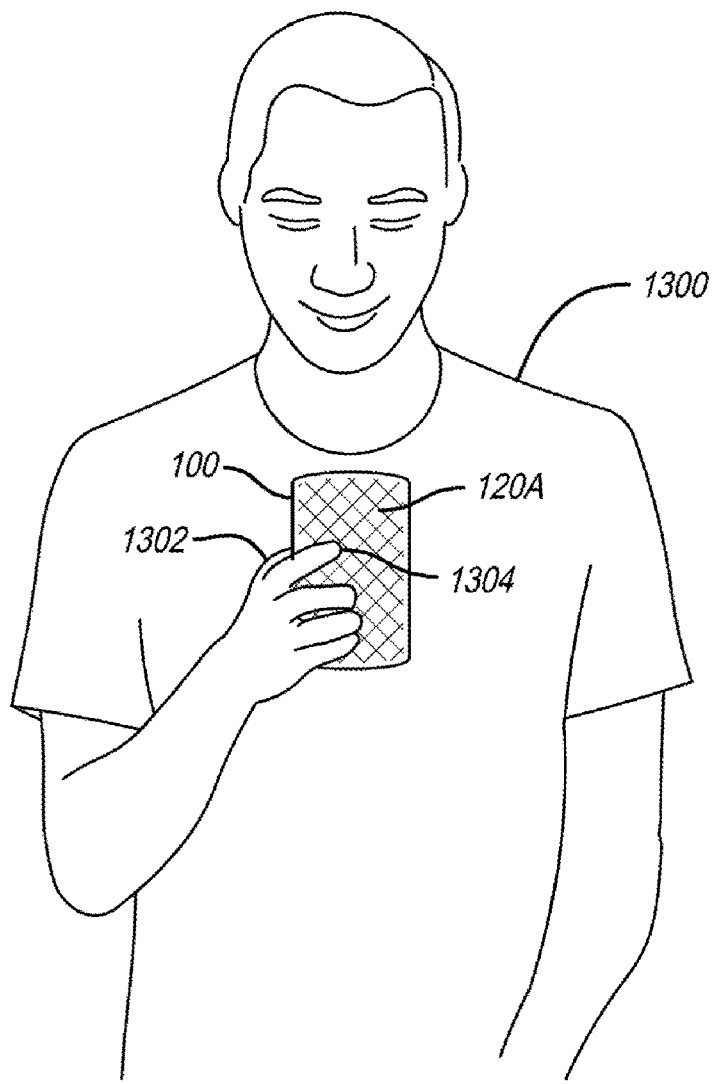
FIG. 13A is a perspective view of a user holding the computing device for single-handed multi-surface input.

Single-Handed Computing Device Handling and Inputting:

FIG. 13A illustrates another mode of operation for computing device 100, in which a user may operate computing device 100 using a single hand. Conventionally, single-handed use of a touch screen computing device limits a user to relatively simple inputs provided with the user's thumb, such as scrolling, or selection of an on-screen indicia that is positioned within reach of the user's thumb. However, by implementing auxiliary touch surfaces as described herein, a user may be provided with greater input capabilities during single-handed operation.

FIG. 13A illustrates an exemplary user 1300 holding computing device 100 using a single hand. The user's thumb 1302 continues to be available as a source of touch input on front screen 110. Additionally or alternatively, one or more of user 1300's other fingers may simultaneously provide touch input to rear surface 120A. For example, one or more of user 1300's other fingers 1304 may operate a touch-based track pad input by contacting rear surface 120A, as described above in connection with FIGS. 11-12. This way, computing device 100 may be held securely, while simultaneously providing user 1300 is options for accurate and affirmative touch-based inputs.

Enabling and Disabling of Auxiliary Input Surfaces

During the course of using a computing device 100, users may grasp the device in a variety of different manners. Meanwhile, some modes of device use may not require or benefit from utilization of auxiliary input surfaces. In such situations, inadvertent contacts with auxiliary input surfaces may result in unintentional or erroneous inputs. Thus, in some circumstances, it may be desirable to enable a user to interactively enable and disable auxiliary touch input surfaces.

Figure 13B:
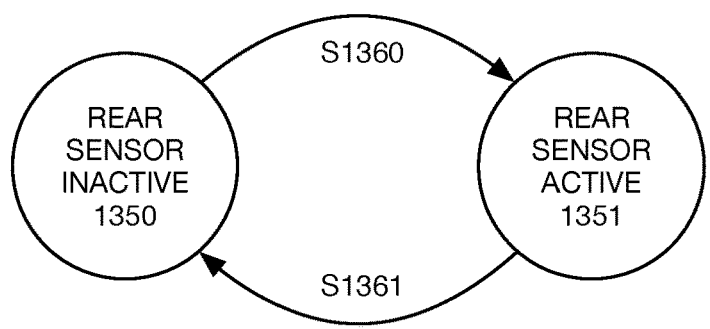
FIG. 13B is a state diagram illustrating user-controlled enabling and disabling of auxiliary input surfaces.

FIG. 13B is a state diagram illustrating operation of computing device 100, in accordance with an exemplary embodiment. In state 1350, rear touch-sensitive surface sensor 120A is disabled, such that device 100 is nonresponsive to haptic contacts with sensor 120A other than a predetermined set of contact types that may be utilized to toggle an operational mode or state of sensor 120A (such as activating the enabling the sensor). In step S1360, computing device 100 detects a predetermined event associated with activation of rear sensor 120A, causing device 100 to transition into state 1351. In state 1351, rear sensor 120A is enabled or fully-active, such that haptic contacts with sensor 120A may be utilized as described elsewhere herein (for example, without limitation, for typing or text entry, for implementation of dynamic input targets, for selection and/or manipulation of three-dimensional or hyper-dimensional objects or scenes, etc.). Within state 1351, computing device 100 may monitor rear sensor 120A or other inputs for an event associated with transition of computing device 100 back to state 1350, in which rear sensor 120A is disabled (step S1361).

A variety of events may be utilized to transition computing device 100 between states 1350 and 1351 (i.e. to enable or disable rear sensor 120A). In some embodiments, predetermined haptic contact types may be utilized. For example, in embodiments having side surface auxiliary sensors (e.g. sensors 120B, 120C, 120D and/or 120E), simultaneous application of pressure to side sensors 120B-E on opposing sides of device 100 (i.e. squeezing of device 100 by the user) may be utilized to activate rear sensor 120A (i.e. transition from state 1350 to 1351); to deactivate rear sensor 120A (i.e. transition from state 1351 to 1350); or both (i.e. to toggle between states 1350 and 1351).

In some embodiments, computing device 100 may detect a predetermined manner of holding device 100 in order to activate (and/or deactivate) rear sensor 120A. For example, rear sensor 120A may be activated in response to holding of device 100 in a landscape position (detected via, e.g., an orientation sensor such as IMU 150) coupled with placement of two thumbs on front touch-sensitive display screen 110 and four fingers on each side of rear surface sensor 120A. In another example, rear sensor 120A may be toggled between states 1350 and 1351 in response to simultaneous tapping of four fingers on rear sensor 120A.

In other example, the relative position of touch points on rear sensor 120A may be utilized as additional criteria for transitioning between states 1350 and 1351; such embodiments may utilize operations described elsewhere herein as dynamic mapping of touch inputs, in order to identify inputs triggering changes in state. For example, haptic contacts arranged relative to one another in a particular shape (regardless of absolute position on sensor 120A) may be utilized to transition from state 1350 to 1351, such as placement of multiple fingers on sensor 120A in a curved shape. Such a shape may be determined by relative positioning of haptic contacts, and in some embodiments, may not even be dependent upon a specific number of haptic contacts but rather a predetermined path in which the contacts are made (e.g. haptic contacts in the shape of a curve, whether the curve is formed from 4, 5 or even more points of contact).

In yet other embodiments, criteria for state transition may additionally or alternatively include detection of a predetermined temporal sequence of contacts. For example, a user may utilize fingers on one hand to effect a rapid succession of haptic contacts on rear sensor 120A with relative positions progressing from left-to-right in order to activate rear sensor 120A (i.e. transition from state 1350 to state 1351, with left-to-right positioning being determined in view of the physical orientation of computing device 100 as sensed by IMU 150), and the user may effect a rapid succession of haptic contacts on rear sensor 120A progressing from right-to-left in order to deactivate rear sensor 120A (i.e. transition from state 1351 to state 1350).

In some embodiments, other criteria may additionally or alternatively be utilized to control transitions between states 1350 and 1351. For example, OS 140A and/or an application 140B may be required to enter a predetermined mode of operation or trigger a software-enabled event in order to activate sensor 120A, or enable detection of predetermined types of haptic contacts that may activate sensor 120A.

While FIG. 13B illustrates two states of use for rear sensor 120A, it is contemplated and understood that in other embodiments, a greater number of states of operation may be employed, with various combinations of software-determined and/or haptic contacts utilized to transition between states. For example, a number of different active states may be provided, in which sensor 120A provides different modes of input or utilization relative to OS 140A and/or an application 140B (e.g. toggling between rear surface text input, track pad sensor, or manipulation of three-dimensional or hyper-dimensional objects or scenes).

While FIG. 13B and discussion relative thereto illustrates examples of transition between operating modes for rear sensor 120A, it is contemplated and understood that in some embodiments, analogous operations may be utilized to activate, deactivate or otherwise transition between modes of operation for other auxiliary sensors such as sensors 120B-E.

Object and Perspective Maneuvers in Three or More Dimensions:

When the user uses multiple fingers on multiple touch-sensing and/or pressure-sensing surfaces of the computing device 100, combined gestures simultaneously applied on multiple input surfaces can be used to perform three-dimensional or hyperdimensional operations on representations of objects rendered in three or more dimensions and/or on the view perspective or environment in which object representations or scenes are rendered.

Figure 14A:
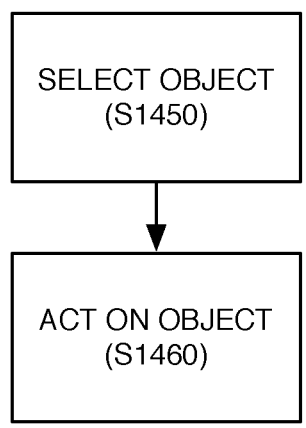
FIG. 14A is a process for utilizing a computing device with multiple touch-sensitive surface inputs to act on an object or scene rendered in three or more dimensions.

In some embodiments, a two-step process may be employed to act on representations of objects rendered in multiple dimensions. As illustrated in FIG. 14A, an object to be acted upon may first be selected from a scene or environment rendered by PED 100 (e.g. on display 110) through user interaction with multiple touch-sensitive surface inputs (step S1450). Once an object is selected, the object may be acted upon in multiple dimensions through further user interaction with multiple touch-sensitive surface inputs (step S1460). In some embodiments, during step S1450, and/or during step S1460, a user may also interactive with touch-sensitive surface inputs to manipulate the perspective or environment in which the scene is rendered.

A selected object may be acted upon to translate the object very precisely and efficiently within a three dimensional or hyperdimensional space using devices with multiple touch-sensitive surface inputs, as described herein. For example, a 3-D gesture with two fingers (one on back surface 120A; one on front surface 110) moving in approximately opposite directions can be used to rotate an object displayed on the front screen, analogously to as if a physical object is held between the two fingers. In another possible 3-D maneuver, a similar 3-D gesture can also be used to change the viewing angle of a scene displayed on the front screen 110.

Figure 14B:
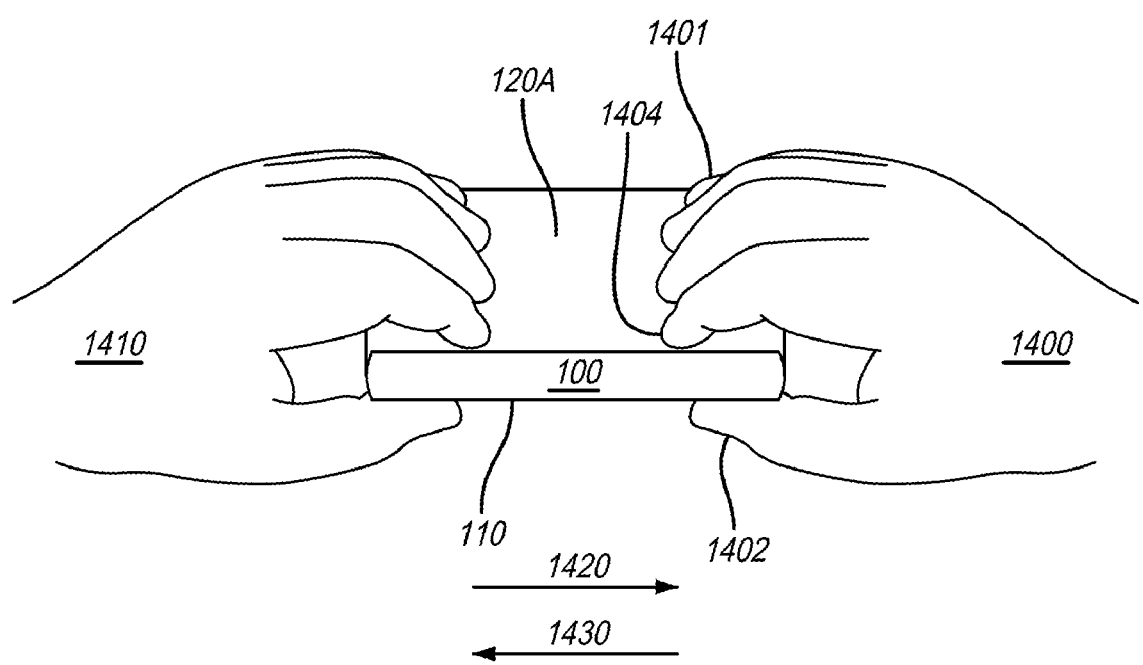
FIG. 14B is a top plan view of a user holding the computing device to maneuver objects within a three-dimensional rendering.

An example of such a rotation gesture is shown in the top plan view of FIG. 14B. A user's right hand 1400 grasps computing device 100 between thumb 1402 (contacting front touch sensitive display screen 110) and index finger 1404 (contacting rear input surface 120A). Left hand 1410 may be used to grasp and better stabilize computing device 100. To rotate an on-screen object clockwise, as viewed from above, index finger 1404 may move in direction 1420 on rear surface 120A, while thumb 1402 may move in direction 1430 on front display 110. Similarly, to rotate an on-screen object counterclockwise, as viewed from above, index finger 1404 may move in direction 1430 on rear surface 120A, while thumb 1402 moves in direction 1420 on front display 110. In other modes of operation, these gestures may be utilized to rotate a view perspective in which a scene is rendered on display 110. The on-screen object representation and/or view perspective may be rotated around an axis of rotation that is perpendicular to the direction of the movement gestures of finger 1404 and thumb 1402.

Such rotation operations are one example of a number of different translation that may be applied to an object representation and/or view perspective, in response to haptic inputs applied simultaneously to multiple different touch sensors on multiple different device surfaces. For example, haptic contacts and gestures on multiple touch-sensitive sensors applied on multiple device surfaces may be utilized to quickly and intuitively alter an object position or view perspective within, for example, any of conventional six degrees of freedom, including changes in position (e.g. forward/backward motion, upward/downward motion, and left/right motion) and changes in orientation (e.g. yaw, pitch and roll).

Multiple touch-sensitive inputs may also be utilized for hyperdimensional translation or manipulation of an object and/or scene. For example, an object rendered in three dimensions may be further animated over time, with time being a fourth dimension of user control based on haptic contact with multiple touch-sensitive surfaces. In one embodiment, a user may hold PED 100 as illustrated in FIG. 14B to manipulate a selected object representation in three dimensions, while simultaneously sliding finger 1401 along lower side surface sensor 120E (not visible in FIG. 14B) to control a time dimension, such that a user may control a desired translation of an object representation over time.

In another use case, simultaneous application of touch input gestures on multiple touch surfaces may be used to manipulate objects within a three-dimensional or hyperdimensional space, where the view of the object may be visually blocked (partially or completely) as rendered to the user. Such gestures may be particularly beneficial in 3-D design applications, enabling rapid selection and manipulation of objects in complex scenes.

Figure 15:
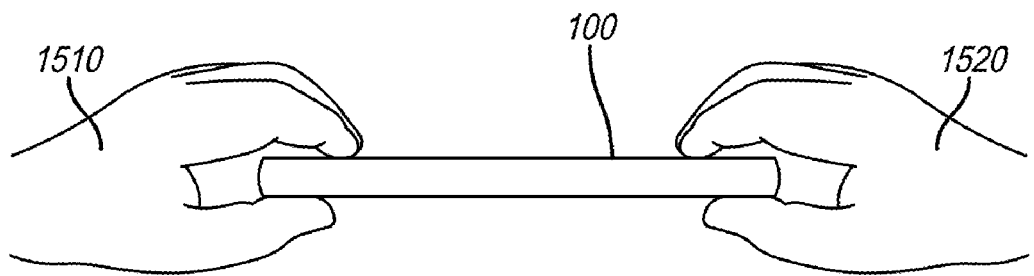
FIG. 15 is a top plan view of a user holding the computing device for selection of an object within a three-dimensional scene.
Figure 16:
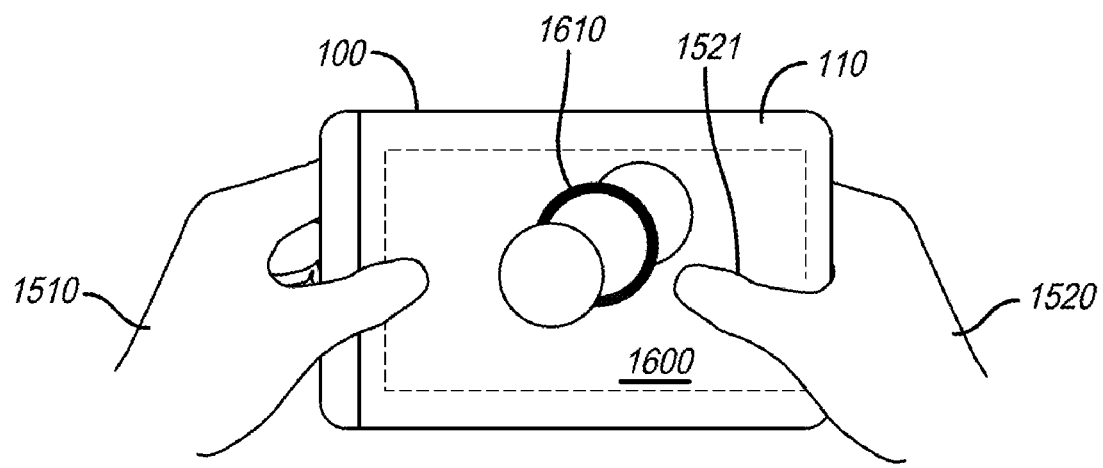
FIG. 16 is a front view of the user and computing device.
Figure 17:
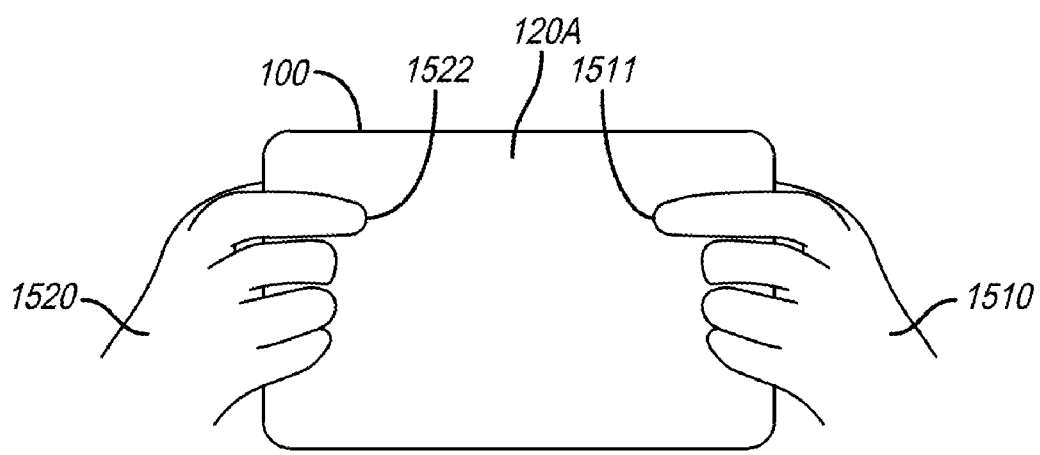
FIG. 17 is a rear view of the user and computing device.

For example, when considering selection and manipulation of an objection in three-dimensional (x, y, z) space, two fingers may be used to define a selection path between starting and ending (x, y) coordinates at minimum and maximum (z) depths rendered in a current scene, with a third finger selecting a (z) coordinate along the selection path for object selection. Such a mechanism is illustrated in FIGS. 15, 16, 17 and 18. FIG. 15 is a top view of computing device 100, held in a landscape orientation between user left hand 1510 and user right hand 1520. FIG. 16 is a front view of computing device 100, used as illustrated in FIG. 15. FIG. 17 is a rear view of computing device 100, used as illustrated in FIG. 15.

FIG. 18 is a process for using a computing device to select an object in three-dimensional space using multiple touch surfaces. In step S1800, a touch point selected on front display screen 110 (i.e. by thumb 1521 in FIG. 16) defines a selection path starting point; specifically, an (x, y) coordinate associated with a selection path, with the selection path starting point having a depth (z) corresponding to the closest (i.e. front-most, in the z dimension) object rendered in a scene 1600 on display 110, at the selected (x, y) coordinate. In step S1810, a touch point selected on rear touch surface 120A (i.e. by index finger 1522 in FIG. 17) confirms the selection path, typically by contacting surface 120A at a point directly behind (or close thereto) the point selected in step S1800 on front display 110. Specifically, contact with rear sensor 120A defines a selection path end point, having an (x, y) coordinate specified by the user's selection in step S1810 and a (z) dimension of the farthest (i.e. rear-most, in the z dimension) object rendered in scene 1600 on display 110 at the selected (x, y) coordinate. In step S1820, the contact point of a third finger (in this case, left hand index finger 1512) on rear touch surface 120A specifies a (z) dimension depth of an object desired for selection, within the selection path range defined by start and end points of steps S1800 and S1810, respectively. Thus, a complex three-dimensional selection may be made very quickly, if not instantly, using a device having only a two-dimensional display, even in circumstances where the desired selection point is obscured to the user when rendered two-dimensionally.

While the process of FIG. 18 is illustrated in a particular sequence of steps, it is contemplated and understood that in some embodiments, the order of steps may be altered. In yet other embodiments, the order of steps may be unimportant; for example, a selection path starting point may always be defined by the (x, y) coordinate of touch contact with front display 110, regardless of whether the selection path end point or selection point depth selection have been specified by contacts to rear touch surface 120A.

In step S1820, the desired distance along the selection path defined in steps S1800 and S1810 may be determined by a one-dimensional input specification. In some embodiments, the selection point (z) dimension may be determined by a relative distance from another finger's contact point; for example, the further (z) selection finger 1511 is from (x, y) selection finger 1521 on rear surface 120A, the greater the (z) dimension depth of the associated selection point. In other embodiments, the selection point (z) dimension may be specified by an absolute position of a touch point relative to a touch surface sensor. For example, in an embodiment having a one-dimensional "slide bar" touch surface on auxiliary bottom touch surface 120D, the (z) dimension of a selection point may be specified by the relative proportional distance of a selection point along bottom auxiliary surface 120D. Alternatively, the (z) dimension of a selection point may be determined by a proportion of the distance between the top edge and bottom edge of rear surface 120A associated with a touch contact along the left-hand side of rear surface 120A, such that the user may slide up or down along the left-hand side of rear surface 120A in order to vary the selection depth.

In some embodiments, rather than using two touch points to define a selection path and a third touch point to select a selection depth, such selections may be made using only two touch points. For example, in the process of FIG. 19, (x, y) coordinates associated with a touch point selection on front panel 110 (e.g. by thumb 1521 in FIG. 16) may determine (x, y) coordinates of a desired object selection (step S1900), while a touch point on rear touch surface 120A (e.g. by finger 1522) may determine a (z) coordinate of the desired object selection (step S1910).

In step S1820, a number of different techniques may be utilized to translate the third touch location to a (z) dimension selection depth. In some embodiments, it may be desirable to define a (z) selection range along a contour plane over the device surface that connects the two (x,y) points on the front and rear panels selected in steps S1800 and S1810. The closer the (z) selection touch point is to the front surface selection point from step S1800, the shallower the (z) selection depth; likewise, the closer the (z) selection touch point is to the rear surface selection point from step S1810, the deeper the (z) selection depth. Thus, the user intuitively selects a depth closer to the "front" of the scene when the (z) selection point is closer to the front display (x, y) selection point, and the user selects a depth closer to the "rear" of the scene when the (z) selection point is closer to the rear display (x, y) selection point. In other words, if one defines d1 as the shortest distance over the surfaces of device 100 from the (z) finger to the (x,y) point on the front screen, and d2 as the shortest distance from the (z) finger to the (x,y) point on the rear panel, a (z) selection coordinate may be calculated such that the following two ratios equal: $d1/d2 = (z1-z)/(z-z2)$.

Different approaches may additionally or alternatively be implemented to specify a desired (z) selection coordinate. In an embodiment, a third surface sensor may be used to specify (z) selection depth, such as a linear touch sensor extending along a lower side edge; e.g., a touch position along a left edge of sensor 120E may correspond to a shallowest scene selection depth, while a touch position along a right edge of sensor 120E may correspond to a deepest scene selection depth, with interim depths corresponding to interim touch locations on sensor 120E.

In another embodiment, gestures may be utilized to adjust a current selection depth, analogous to use of a trackpad for 2D pointer navigation. For example, a haptic contact with rear touch sensor 120A in step S1820 consisting of a swipe towards the rear display (x, y) selection point of step S1810 may cause a current (z) selection depth to move rearwards by an amount proportional to the length of the swipe; likewise, a swipe away from rear display (x, y) selection point of step S1810 may cause a current (z) selection depth to move forwards within the scene proportionally to the length of the swipe.

In some embodiments, a visual cue may be provided to a user to convey the current selection point in three-dimensional space during the selection processes described above. For example, the coloration, brightness, contrast and/or other appearance characteristics of an object closest to the current selection point may be varied on display 110 in order to convey to a viewer the object that would be selected if the current touch inputs are confirmed. In another example, a pointer object may be rendered three-dimensionally within scene 1600 as a position indicated by current selection point. In the depiction of scene 1600 in FIG. 16, three balls are rendered, each with increasing z dimension depth and slightly offset in their x and y positions, such that they are rendered as overlapping on front display 110. Middle ball 1610 is rendered with bold lines, providing a visual cue that the user's current finger positions would act to select ball 1610.

When the (x,y,z) coordinates of the selection point and/or object to be selected are determined using any of the foregoing techniques, the user can then provide a confirming input to actually select a target object. Exemplary confirming inputs may include, without limitation, hard-press or long-press by one or more of the fingers involved in object selection (e.g. thumb 1521 or fingers 1511 and 1522), or conveyance of an audible command by the user (which may be interpreted, for example, by a speech recognition function implemented by OS 140A).

When an object is selected, operations can be performed on the object by using the fingers mentioned above, with or without other fingers' further involvement. For instance, a user may move the z finger 1511 to change the depth of the selected object, while the (x,y) coordinates of the selected object can be maintained by keeping the xy selecting finger 1521 staying at its selecting position. A user may move the xy selecting finger 1521 to change the (x,y) location of the object. Moving the front and back xy fingers 1521 and 1522 in opposite directions may act to rotate the object.

Dynamically Mapping Between Touch Inputs and Controlled Objects on the Screen:

In some cases of current touch screen inputs, visual elements on a display screen that are responsive to touch input (such as buttons, tools, or other software-defined selectable inputs) are placed statically on a screen display. The requirement of touching pre-fixed visual elements statically located at absolute positions on the screen in order to make correct inputs may, for example, be a serious limitation when more than two elements need to be controlled at the same time, because users typically use one or two fingers for touch inputs on a front screen. In such circumstances, users would have to very quickly switch amongst multiple fixed input elements. Such static selectable elements may be very inefficient and cumbersome by, for example, consuming screen space even when the element is not used, and obscuring portions of the screen that the user is touching. In some circumstances, static selectable elements may be placed inconveniently along edges of a display to reduce overlapping of important application display areas, but as a result, they may be difficult for users to reach. Additionally or alternatively, selection of such elements may require positioning of a user's fingers in such a way that the user's view of other elements or information of the display is obscured.

In some embodiments, dynamic mapping between touch location and control may be utilized, potentially enabling movement of a user's fingers away from the user's sight lines during use. The touching points by the user's hand may be dynamically mapped to different input elements or actions (whether those input elements or actions are rendered visually on a device display screen or not), according to the relative location of touch points to one other. Dynamic mapping of touch-based input gestures may be particularly advantageous when implemented with a touchscreen or touch sensor that is positioned on a surface not directly facing the user, because in such circumstances a user may otherwise have difficulty consistently and accurately contacting sensor targets that are at static locations. Static sensor targets implemented on surfaces or sensors facing away from the user may be particularly challenging with relatively small or numerous sensor targets; for example, while a user may be able to reliably contact "left half of surface" and "right half of surface", reliably selecting from amongst (for example) four or more portions of a surface may be challenging when borders between regions are static.

Furthermore, the dynamic mapping can be supplemented by other sensors. For instance, data from IMU sensors 150, which detect the orientation of the device, can be combined with the relative location information of touch points to determine a mapping between touching points and the input elements on the screen.

Figure 20:
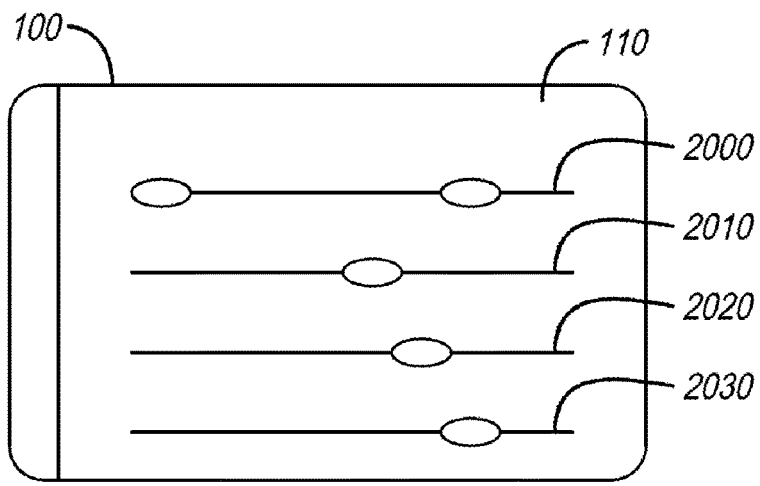
FIG. 20 is a front view of the computing device implementing an application receiving multiple relative multi-surface touch inputs.
Figure 21:
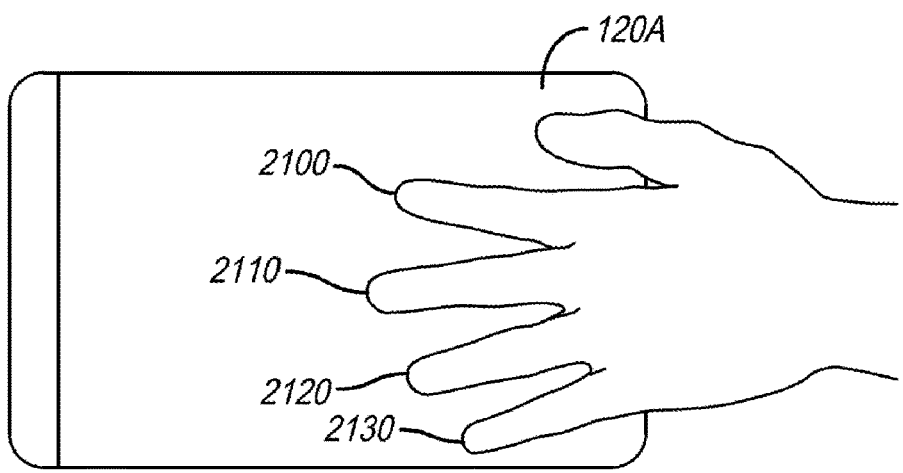
FIG. 21 is a rear view of a first configuration for providing such touch inputs.
Figure 22:
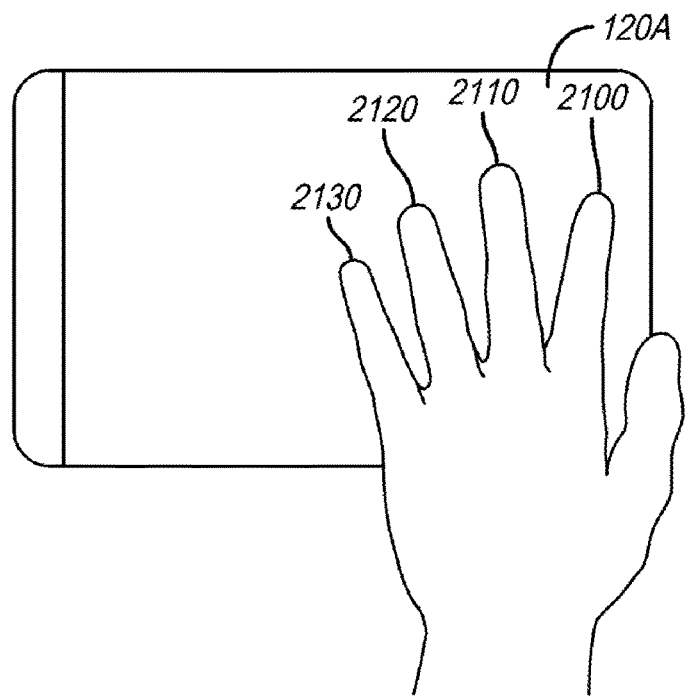
FIG. 22 is a rear view of a second configuration for providing such touch inputs.

For example, FIG. 20 illustrates a display on front display screen 110 of computing device 100, rendered by an application 140B allowing users to play a 4-string instrument, including renderings of strings 2000, 2010, 2020 and 2030 as selectable elements within the application 140B. FIG. 21 illustrates control of such an application using rear touch surface 120A, wherein four of a user's fingers 2100, 2110, 2120 and 2130 are determined to control actuation of strings 2000, 2010, 2020 and 2030, respectively. In particular, haptic contacts from the user's fingers 2100, 2110, 2120 and 2130 are detected by rear touch-sensitive sensor 120A, and utilized to trigger various events in response to those haptic contacts, where each event is selected from amongst a plurality of event types based upon the position of the haptic contact relative to other haptic contacts. Thus, haptic contacts from fingers 2100-2130 may be dynamically mapped (e.g. by application software 140B executed by processor 130) to events associated with actuation of strings 2000 (rendered as selectable indicia on display 110), according to each finger's location relative to other fingers as compared to the location of each string 2000 relative to other strings on the screen 110, rather than requiring specific touchpoints on surface 120A to be associated with each an actuation event for each string 2000. Thus, when a user holds computing device 100 in the orientation of FIG. 22, wherein fingers 2100-2130 are distributed horizontally across rear surface 120A rather than vertically, each finger may maintain its allocation to strings 2000-2030 due to the finger's touch point relative to other fingers. As a result, the user does not have to touch the one exact place corresponding to the static location of a string actuation event, in order to manipulate the string. Instead, as long as the four fingers have a relative spatial order amongst themselves when touching the touch surface (whether front screen 110 or an auxiliary touch surface 120), each finger will be mapped to an event for actuation of the correct string it is supposed to touch or control. In some embodiments, such mapping of haptic contacts to software-defined events may be accomplished by implementation of OS 140A or Application 140B by microprocessor 130. While the example of FIGS. 20 and 21 are explained in the context of dynamic mapping of contacts with rear sensor 120A, it is contemplated and understood that in other applications, a user's contacts with front display screen 110 may additionally or alternatively be mapped dynamically to input targets or non-displayed input events. Thus, for example, a user may position fingers 2100, 2110, 2120 and 2130 against front screen 110 but in the horizontal orientation shown in FIG. 22, in order to control individual actuation of the vertically-distributed string indicia 2000, 2010, 2020 and 2030, respectively.

Figure 23:
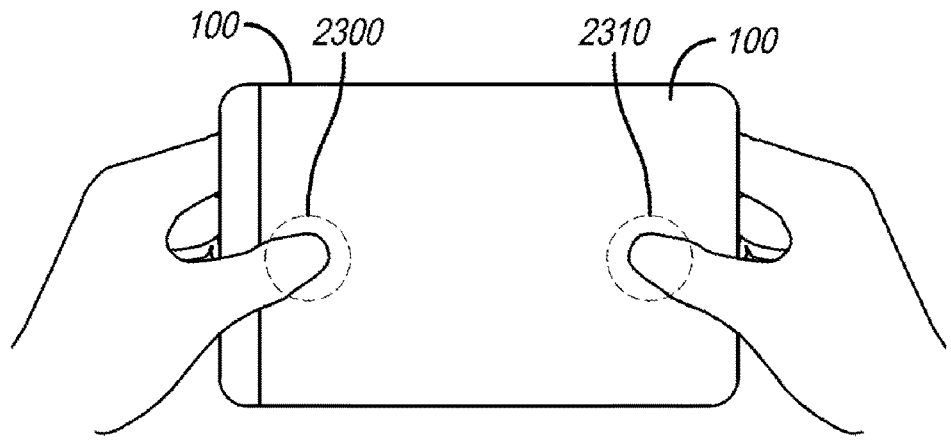
FIG. 23 is a front view of a computing device implementing an application with static control targets.
Figure 24:
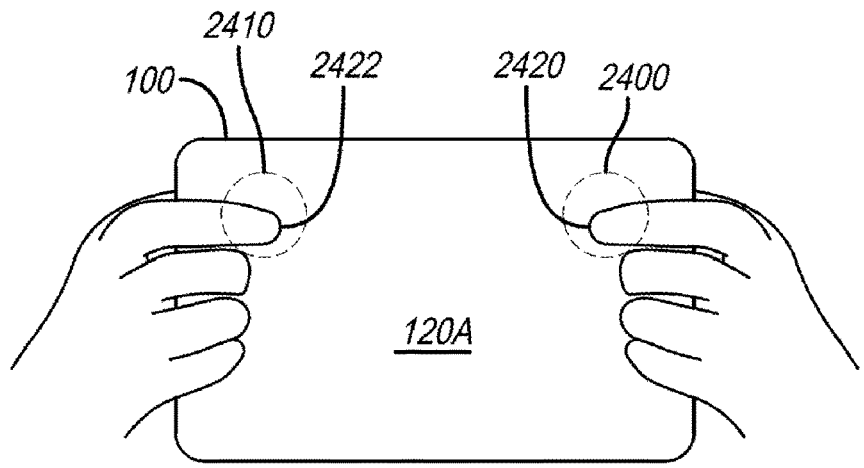
FIG. 24 is a rear view of the computing device implementing relative control targets on a rear surface touch sensor.

Another example is shown in FIGS. 23 and 24, providing dynamic left and right controls on auxiliary touch surfaces. Conventionally, control targets may be rendered on front display 110 in fixed positions; for example, in a racing game application, target 2300 may be associated with a braking function, while target 2310 may be associated with an accelerator function. Targets 2300 and 2310 may occupy screen area that is obscured by a user's fingers during use, and/or which may be uncomfortable for a user's particular hand size and holding position. However, in computing devices providing multiple touch surfaces for touch-based input, relative touch controls may be provided on surfaces other than front screen 110, avoiding obscuring portions of screen 110 during use of an application and providing users with increased flexibility in holding position. FIG. 24 illustrates such an embodiment. Rear surface touch sensor 120A may receive user inputs at locations 2400 and 2410, from fingers 2420 and 2422, respectively. IMU 150 is an orientation sensor providing data to microprocessor 130 enabling determination of the spatial orientation of computing device 100, such that computing device 100 may determine the left/right relationships between locations 2400 and 2410 relative to a user holding computing device 100. The leftmost of the touch locations on rear surface 120A may then be associated with a braking function, with the rightmost of the touch locations on rear surface 120A may be associated with an accelerator function.

Figure 26:
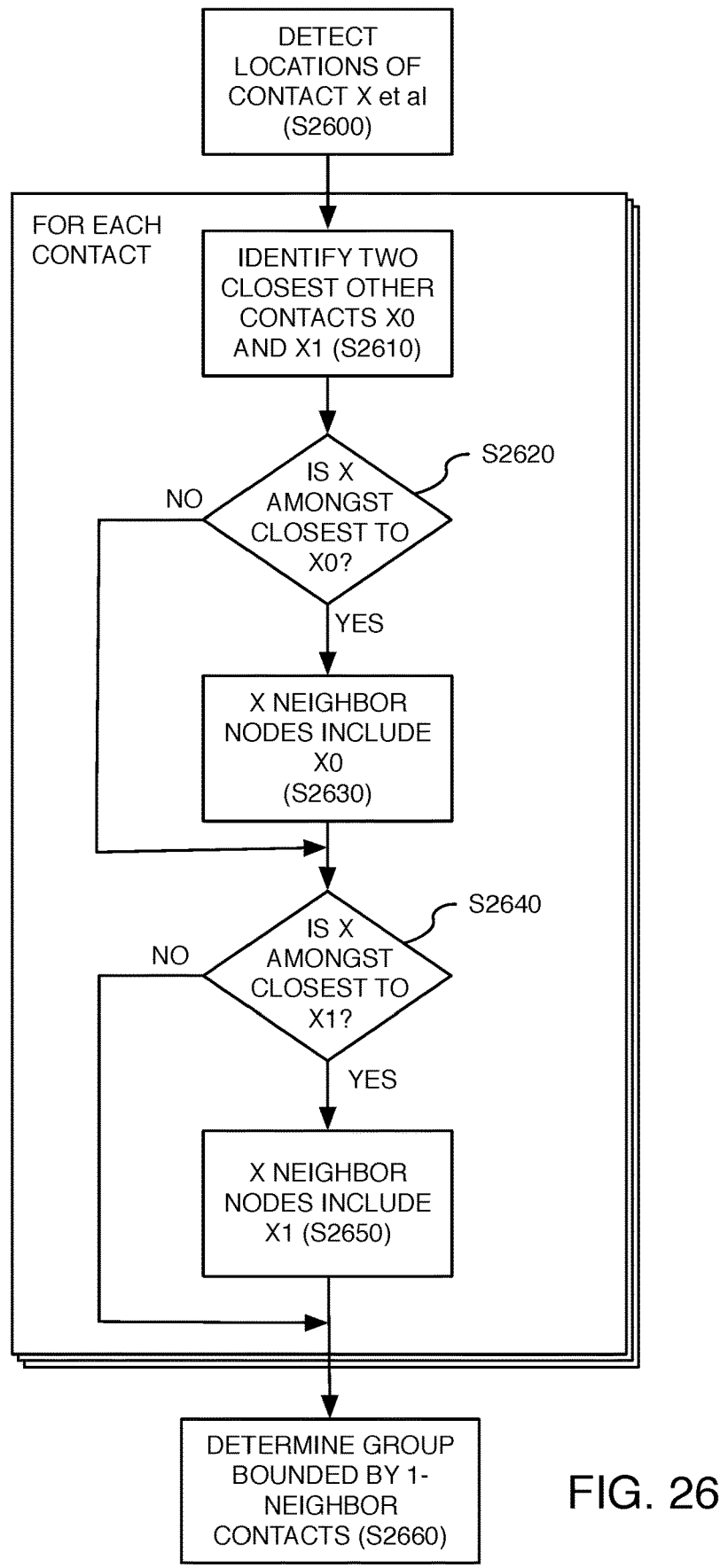
FIG. 26 is a process for grouping haptic contacts on a touch sensor.
Figure 27:
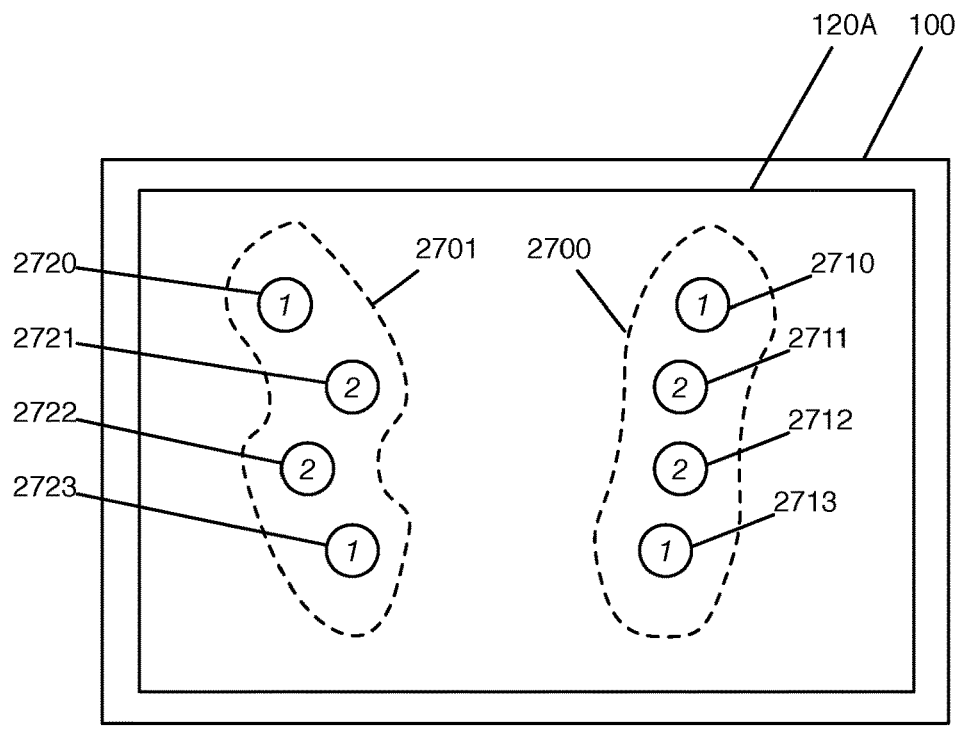
FIG. 27 is a schematic illustration of a process for grouping haptic contacts on a device rear touch sensor.

In some embodiments, dynamic mapping may include a contact grouping functionality. Contact grouping may be useful to relate or characterize different points of haptic contact for purposes of interpreting or characterizing such contacts as input events. For example, some applications may wish to distinguish between a user's left hand fingers and a user's right hand fingers on a touch surface, without reliance on arbitrary and fixed physical contact area boundaries, thereby enabling greater flexibility in how a user holds and contacts an electronic device 100. FIG. 26 illustrates a process that may be used for contact grouping, particularly for identifying groups of four contacts, such as may be common on a device rear surface when held with thumbs against the front surface and fingers against the rear surface (as in FIG. 7). FIG. 27 is an exemplary view of implementation of the process of FIG. 26 on device 100.

As described above, electronic device 100 includes rear auxiliary touch surface sensor 120A. In FIG. 27, a user grasps device 100 in a position analogous to that of FIG. 7. The user's left hand fingers create haptic contacts 2710, 2711, 2712 and 2713. The user's right hand fingers create haptic contacts 2720, 2721, 2722 and 2723. Using a process such as that of FIG. 26, contacts 2710-2713 may be associated with a contact group 2700. Contact groupings may be determined using a process such as that of FIG. 26, by a device OS 140A, by an application 140B, and/or by firmware integrated within a touch sensor or some other component within device 100. The contact group identification may then be potentially utilized by, e.g., OS 140A and/or application 140B in order to correlate contact events with desired actions. Similarly, contacts 2720-2723 may be associated with a contact group 2701.

For example, implementing the process of FIG. 26, a location on sensor 120A is determined for each haptic contact 2710-2713 and 2720-2723 (step S2600), e.g., such as by microprocessor 130 interacting with auxiliary input surface sensor 120A under control of firmware and/or OS 140A to determine contact positions. For each of those contacts, steps S2610-S2650 may be performed to determine a number of nearest neighbors. Considering a first reference contact 2711, two closest other contacts are identified (i.e. contacts 2710 and 2712) (step S2610). For a first closest contact identified in step S2610 (e.g. for contact 2710), a determination is made as to whether reference contact 2711 is also amongst the two closest contacts. If so, reference contact 2711 is deemed to include the first closest contact 2710 as a nearest neighbor (step S2630), e.g., a nearest neighbor count for reference contact 2711 may be incremented. Next, a determination is made as to whether reference contact 2711 is also amongst the two closest contacts for reference contact 2711's other closest contact, contact 2712. If so, reference contact 2711 is deemed to include second closest contact 2712 as a nearest neighbor (step S2650), e.g. a nearest neighbor count for reference contact 2711 is incremented again. Finally, in step S2660, a contact group may be identified as a series of contacts bounded by contacts having one nearest neighbor. Implemented in the example of FIG. 27, contacts 2720 and 2723 have one nearest neighbor, while contacts 2721 and 2722 have two nearest neighbors, such that contacts 2720 and 2723 set the bounds of contact group 2701. Similarly, contacts 2710 and 2713 have one nearest neighbor, while contacts 2711 and 2712 have two nearest neighbors, such that contacts 2710 and 2713 set the bounds of contact group 2700.

In other embodiments, other techniques for grouping contacts may be utilized. For example, contacts may be grouped using known clustering techniques, such as density-based spatial clustering, examples of which are describe in, inter alia, Ester, Martin; Kriegel, Hans-Peter; Sander, Jörg; Xu, Xiaowei (1996). Simoudis, Evangelos; Han, Jiawei; Fayyad, Usama M., eds., A density-based algorithm for discovering clusters in large spatial databases with noise, Proceedings of the Second International Conference on Knowledge Discovery and Data Mining (KDD-96), AAAI Press. pp. 226-231, CiteSeerX 10.1.1.121.9220, ISBN 1-57735-004-9.

Determinations of contact groups 2700 and 2701 may thereafter be utilized (e.g. by implementation of OS 140A and/or an application 140B by microprocessor 130) to characterize input events. For example, a predetermined number of contacts within a contact group may be used to trigger an event, mode of input, or the like. In some embodiments, a range of area on a touch sensor such as rear sensor 120A may be defined around contacts within a contact group (such as areas 2700 and 2701), such that repeating or additional haptic contacts within the defined areas are also characterized as being associated with a particular contact group.

In some embodiments, it may additionally or alternatively be desirable to translate dynamic inputs by rotating the x-y coordinate space based on orientation of the input device and/or based on the relative positioning of multiple contacts. Such translation may be useful to obtain accurate input from a user, even then the user's mental conception of the input device orientation in space differs from the actual physical orientation on an input surface.

Orientation detection and translation may be implemented by sensor firmware, a device OS, or application software. In some embodiments, orientation and translation may be performed using a linear best fit technique. A linear best fit technique may be particularly effective in applications where haptic contacts are anticipated over an elongated area, such as might be associated with the natural side-by-side arrangement of a user's fingers. Linear or elongated contact areas may also be associated with virtual, software-implemented analogs to manual real-world devices such as an arrangement of guitar strings spanning the width of a guitar fretboard, or a sequence of side-by-side keys on a keyboard. However, an electronic device (particularly a small handheld electronic device and/or a touch screen device with smooth surfaces lacking significant physical landmarks) may not provide a user with as strong a sense of physical orientation as a physical guitar, keyboard, or other item of equipment being simulated, thereby making it more difficult for a user to accurately and consistently orient fingers on the electronic device for targeted haptic contacts. Also, users may have different preferences in the way that an electronic device is held. Orientation and translation techniques such as those described herein may be helpful in accurately and consistently correlating haptic inputs with desired input events, while providing users with flexibility in the way that a device is held or contacted.

Figure 29:
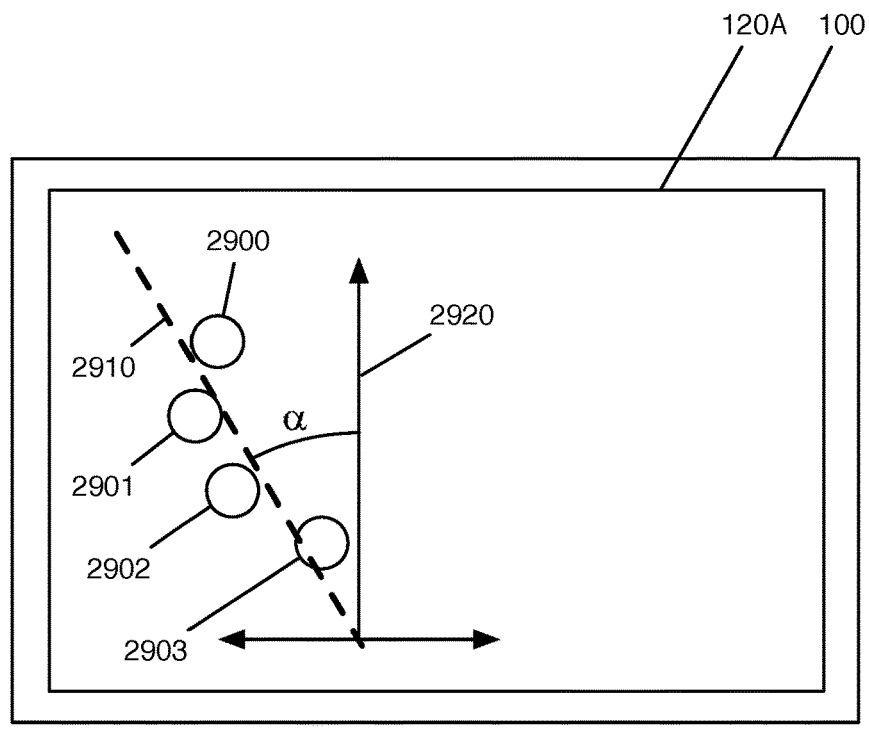
FIG. 29 is a schematic illustration of a process for detecting contact orientation and translating touch input on a device rear touch sensor.
Figures 28, 32:
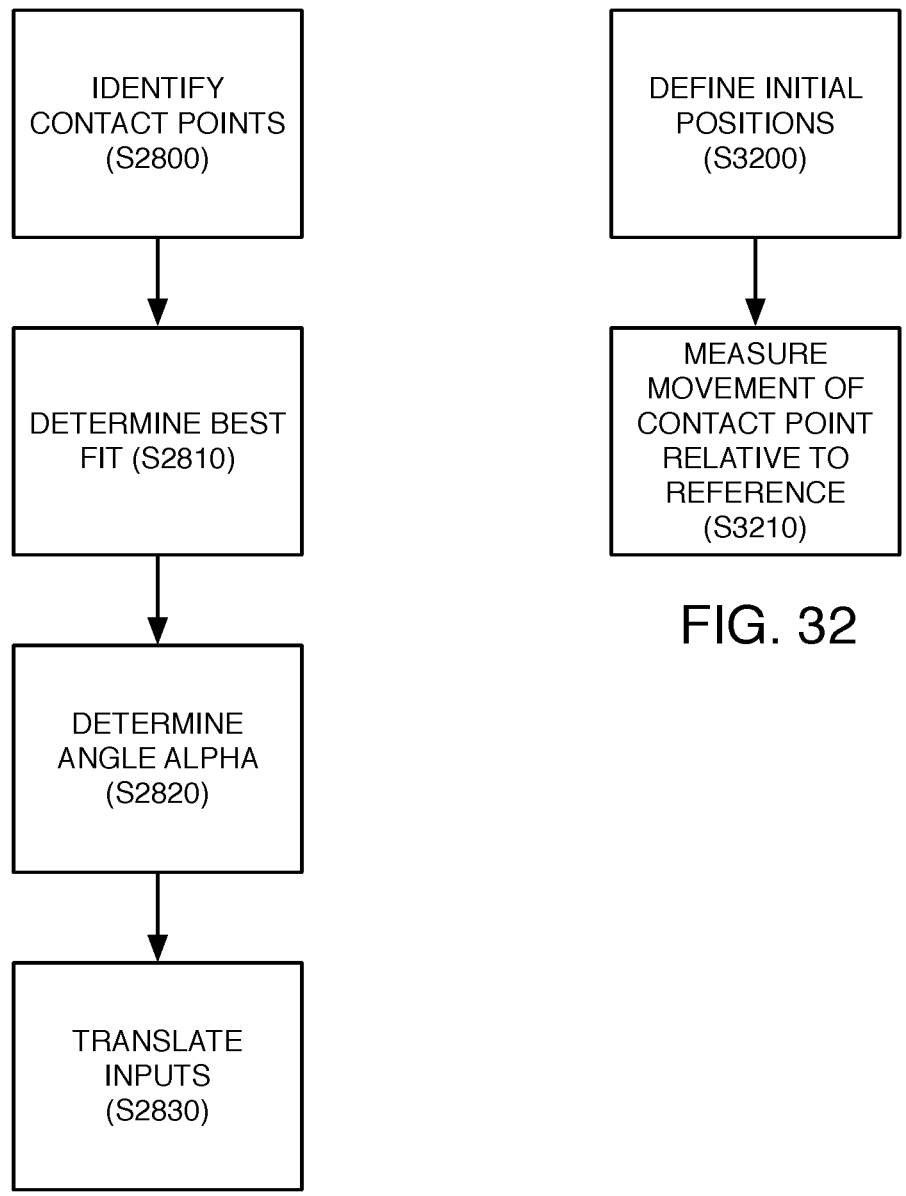
FIG. 28 is a process for detecting contact orientation and translating touch input.
FIG. 32 is a process for converting multiple haptic contacts to variable input parameters.

FIGS. 28-29 illustrate an exemplary implementation of orientation detection and input translation. In step S2800, a set of contact point positions on a touch sensor is determined, such as points 2900, 2901, 2902 and 2903 on touch sensor 120A in the illustration of FIG. 29. In some embodiments, the set of contact point positions determined in step S2800 may be points associated with a particular contact group, such as a contact group identified using the process of FIG. 26. In step S2810, processor 130 calculates a line of best fit (such as line 2910) through the contact points identified in step S2800. In step S2820, processor 130 determines an angle α between the line of best fit 2910, and axis 2920 having a predetermined orientation relative to device 100 and touch sensor 120A. In step S2830, haptic inputs are spatially translated by angle α. For example, an arrangement of locations on sensor 120A associated with software-defined input targets may be rotated by α, such that the arrangement of input targets remains oriented with a user's hand position rather than statically oriented relative to device 100.

In some embodiments, orientation detection and translation may be applied dynamically. For example, the process of FIG. 28 may be performed each time a user simultaneously applies four fingers to a touch sensor surface, such as rear auxiliary input touch sensor 120A. Such implementations may be useful for allowing a user to periodically vary holding position of device 100.

While the embodiment of FIGS. 28-29 illustrates a linear best fit approach to determining a user's hand orientation relative to device 100, it is contemplated and understood that alternative approaches may be used. For example, in some embodiments, rather than determining a linear best fit in step S2800, best fit of a predetermined curve may be determined. In some embodiments, the predetermined curve may be defined based on a particular user's natural finger orientation, whereby a user may define the curve used for orientation detection by naturally resting the user's fingers on a touch sensor such as sensor 120A.

Figure 30:
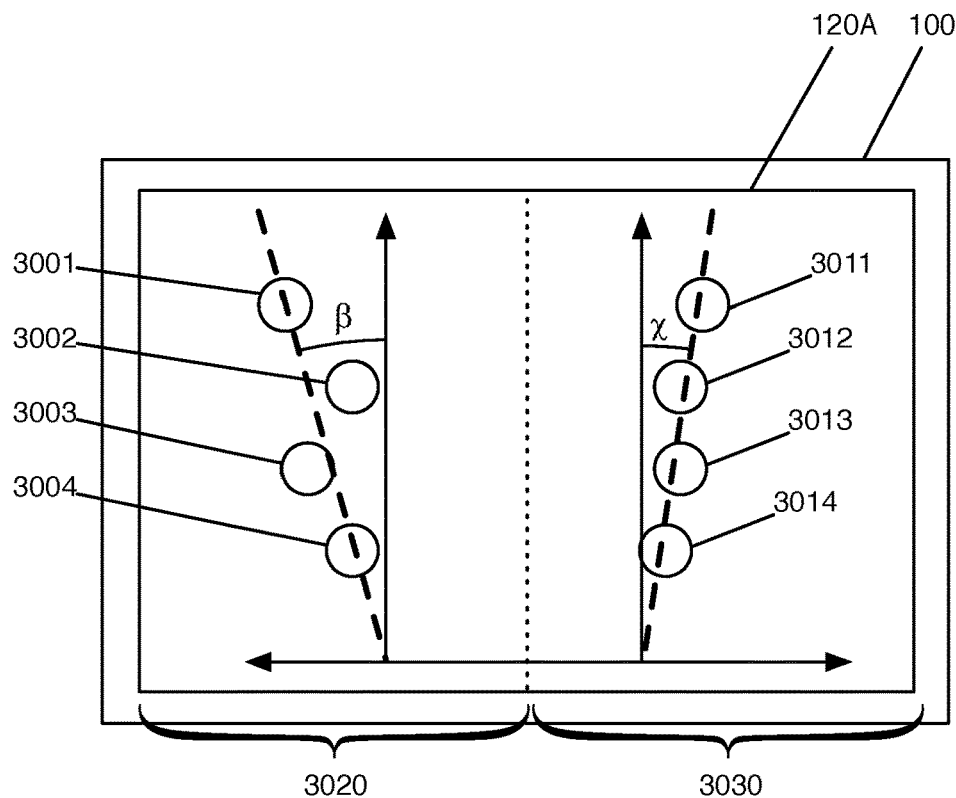
FIG. 30 is schematic illustration of contact orientation and translation applied independently to multiple contact groups.

In some embodiments, orientation detection and translation may be applied separately to different touch sensor surfaces and/or different portions of a touch sensor surface. For example, in the embodiment of FIG. 30, contacts 3001, 3002, 3003 and 3004 may be associated with a first contact group. The process of FIG. 28 may be applied to those contacts to determine an angle β, with angle β applied to haptic contacts on portion 3020 of sensor 120A. Similarly, a user's other hand may be associated with contacts 3011, 3012, 3013 and 3014, which contacts may be utilized in the process of FIG. 28 to determine an angle χ, which angle χ may then be applied to haptic contacts on portion 3030 of sensor 120A. In this manner, device 100 may compensate for variations in holding position for each hand separately.

In some embodiments, dynamic mapping implementations may include an input logic that produces linear or continuous events based upon the relative distance and/or direction of multiple haptic contacts. Thus, multiple haptic contacts may be converted into a single input parameter, which may be a single discrete event or a continuously varying input parameter. For example, a device application or operating system may interpret a rapid sequence of haptic contacts along a linear path as a single, discrete input event having a unique characterization including a direction characteristic. As another example, a device application or operating system may interpret rapidly-repeating haptic contacts as a discrete "fast tapping" event (which may be characterized, for example, by a single location characteristic (whether absolute or dynamic) and an average tap frequency), rather than interpreting the input as a large number of separate haptic contacts.

Figure 31:
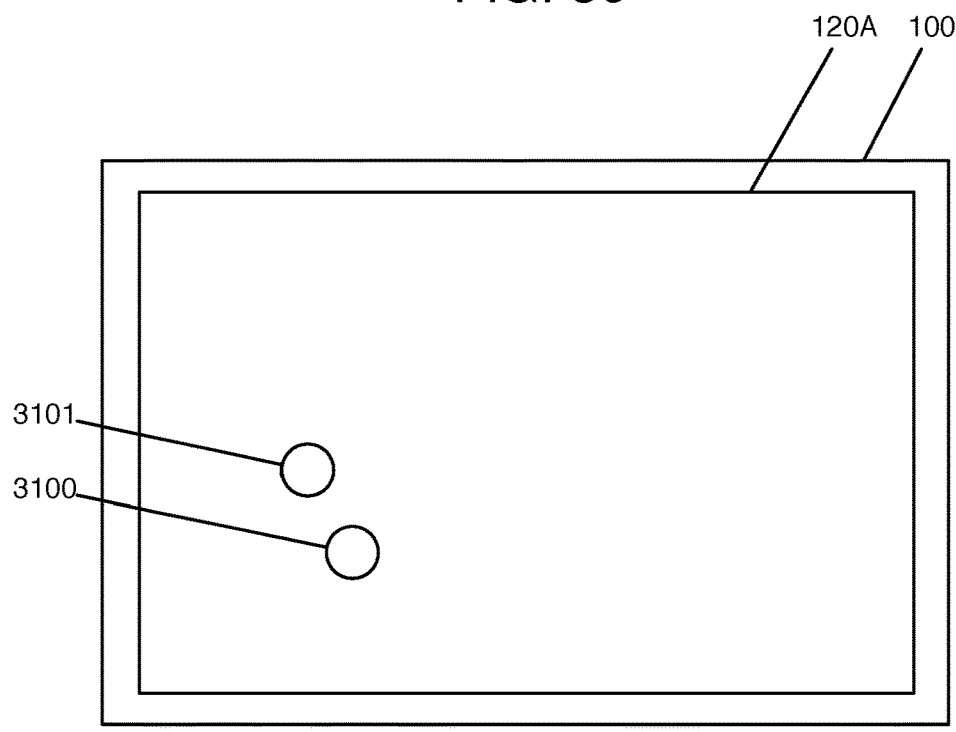
FIG. 31 is a schematic illustration of converting multiple haptic contacts to a single input.

In another example, two fingers may be utilized to control a pointer or otherwise perform a pointing function (or another function in which an input parameter is varied based on multiple haptic contacts), without regard to the absolute placement of the fingers on a touch sensor. FIGS. 31 and 32 illustrate such an embodiment. Two fingers may be placed in positions 3100 and 3101 on sensor 120A to define initial positions (step S3200). One of the fingers (e.g. contact position 3100) will preferably remain relatively static in position on sensor 120A, while contact position 3101 is translated by a user about contact position 3100. The relative movement (e.g. in two dimensions) of dynamic contact position 3101 relative to anchor contact position 3100 may then be utilized as a corresponding relative change in an associated input event, such as relative movement of a pointer on primary display 110, or relative directional movement of another software-defined indicium rendered on display 110 (step S3210). While reference contact 3100 will preferably remain relatively static, it is contemplated and understood that in some use cases, the location of a user's finger associated with haptic contact point 3100 on surface sensor 120A may drift; in such circumstances, the reference by which the relative offset of control haptic contact 3101 may be adjusted with movement of contact point 3100, such that the resulting input provided to, e.g., an application layer of software on device 100, is determined by the relative offset between haptic contacts 3100 and 3101.

Converting of multiple haptic contacts into a discrete or linearly-varying input parameter may also be effectively utilized for inputs such as speed controls. For example, an initial spacing between contacts 3100 and 3101 may define a zero-movement state for an object rendered on display 110 (such as a race car or the like). Movement of dynamic contact 3101 further away from anchor contact 3100 may be associated with an increase in speed. Movement of dynamic contact 3101 closer to anchor contact 3100 may be associated with a decrease in speed.

In some embodiments, converting operations as described herein may include both a directional and speed component. For example, with contact 3100 defining a reference point, a change in angle of rotation of contact 3101 relative to anchor contact 3100 may be associated with a directional input, which a change in distance between contacts 3100 and 3101 may be associated with a change in speed. Thus, for a running game, users may dynamically control both direction and speed with a single pair of haptic contacts, on any of multiple touch sensitive screens or touch sensitive input sensors. Similarly, for a first person shooter, a pair of haptic contacts may be utilized to control gun operation, with directional input utilized for weapon pointing and speed (i.e. relative distance) used to control rate of fire or some other aspect of a player's operation.

Converting of multiple haptic contacts, and/or patterns of haptic contacts, into a single event (whether discrete or continuous), may be performed in a variety of contexts, including by one or more of touch sensor firmware, an operating system (e.g. drivers or libraries), or an application program.

Figure 33:
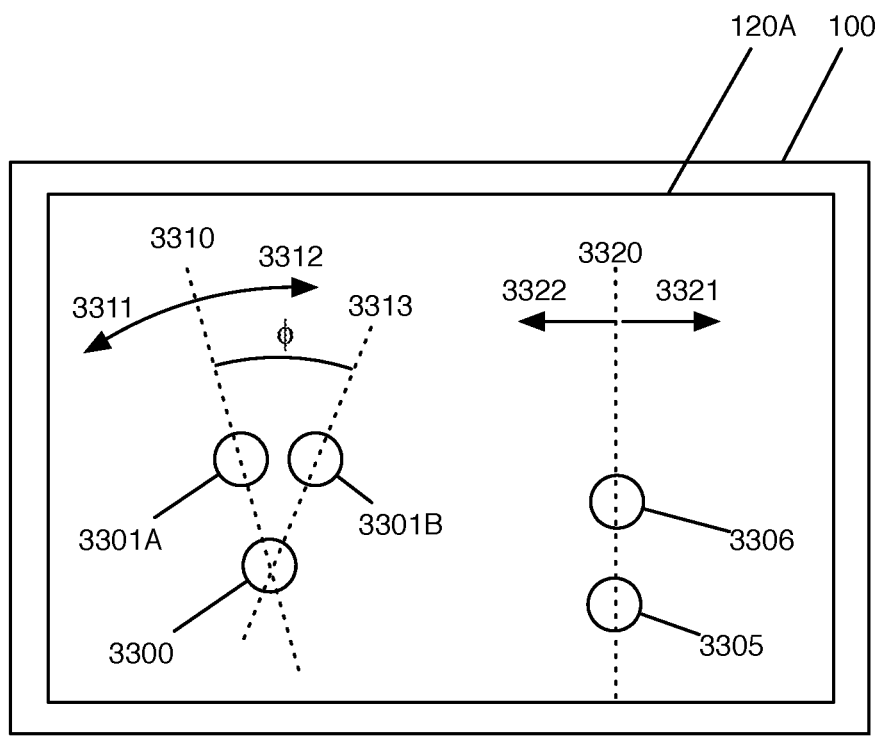
FIG. 33 is a schematic illustration of an electronic device utilizing multiple haptic contacts to derive rotational and linear input parameters.

In another application, implementations of dynamic mapping may be used to implement the complex and simultaneous controls in a driving or flying game. For example, in such a game, a vehicle may be rendered by microprocessor 130 implementing an application 140B, with the rendered vehicle being controlled by haptic contacts with screen 110 and auxiliary input surface sensors 120. FIG. 33 illustrates an exemplary dynamic control scheme using rear auxiliary input sensor 120A, with both rotational and linear control references. A first pair of contact points with rear sensor 120A, consisting of contacts 3300 and 3301A, may be utilized for changing direction of a rendered vehicle's movement, analogous to turning a steering wheel, using rotational control references. In particular, initiation of haptic contacts 3300 and 3301A defines reference positions, with reference line 3310 determined as interconnecting contact points 3300 and 3301A and utilized as a zero rotation, or neutral, reference. Subsequently, a user may slide a finger associated with contact point 3301A over touch sensor 120A to, for example, contact point 3301B. A new rotational line 3313 interconnects points 3300 and 3301B, providing a rotational input consisting of an angle φ between reference line 3310 and rotational input line 3313. Thus, for example, contact point 3301B may be moved in direction 3311 to provide input interpreted by microprocessors 130 and a racing game application 140B as steering input towards the right side of a vehicle rendered on front display 110; or in direction 3312 to provide steering input towards the left side of a vehicle rendered on front display 110.

Linear (rather than rotational) inputs may be implemented in a similar manner. For example, in the example of FIG. 33, haptic contacts 3305 and 3306 may be utilized to provide linear input to control rendering of a race car accelerator or brake position. Initial placement of reference contact 3305 and variable contact 3306 dynamically defines linear reference path 3320. The distance of contact 3306 from reference path 3320 provides a linear input for interpretation by software application 140B. Thus, placement of contact position 3306 on reference path 3320 provides a zero input, which may be interpreted as neither application of accelerator or braking. Movement of contact 3306 in direction 3321 may be interpreted as application of an accelerator, with a level of acceleration determined by a distance in direction 3321 between contact point 3306 and reference path 3320. Similarly, movement of contact 3306 in direction 3322 may be interpreted as application of braking, with an amount or intensity of braking (analogous to pressure on a conventional brake pedal) determined by a distance in direction 3322 between contact point 3306 and reference path 3320. While reference paths 3310 and 3320 are illustrated in the embodiment of FIG. 33 as linear paths, it is contemplated and understood that reference paths having curved or other shapes may also be used.

In some embodiments, it is contemplated and understood that a user's hand position may drift during use. Thus, reference paths 3310 and 3320 may vary dynamically on sensor 120A, based on the position of reference haptic contacts 3300 and 3305, respectively. Specifically, for example, linear reference path 3310 may maintain its angle relative to sensor 120A but may be translated in X and Y dimensions on sensor 120A based on movement of reference haptic contact 3300, such that linear path 3310 remains passing through contact point 3300. Reference path 3320 may be similarly translated in X and Y dimensions on sensor 120A, maintaining its angle relative to the sensor, such that path 3320 remains passing through reference contact point 3305 despite drifting of the position of reference haptic contact 3305.

At any point, users may optionally be able to lift and reset contact pair 3305 and 3306, and/or contact pair 3300 and 3301, in order to reset reference paths 3310 and 3320, respectively, (e.g. resetting both X-Y position and angle) thereby allowing a user to quickly respond to varying ways of holding device 100 without interrupting device operation. Thus, when implemented on a rear surface touch sensor 120A, the control mechanism of FIG. 33 may provide intuitive control of both rotational steering input and linear brake/accelerator application using two pairs of fingers, while holding device 100 in a natural position and without at all obstructing a user's view of front display screen 110.

In yet another application, a combination of dynamic input mapping, contacts grouping, orientation detection, and input translation can be used to implement a dynamically-floating virtual (computer) keyboard on the rear or the front surface of a portable or mobile device such as device 100. In this case, the user is able to tap on a touch-sensitive surface of the device for text typing, while not having to rely on a static position mapping of all the keys as in certain embodiments described elsewhere herein. Instead, four fingers of the left hand can be detected as group one; four fingers of the right hand can be detected as group two. Every time all four fingers of a group make contacts with the touch-sensitive surface, the four contacts reset the positions of touch screen target areas corresponding to four predetermined reference keys. Other key target areas can then be determined relative to the detected positions of the four predetermined reference keys, with target positions and haptic contacts translated based on the detected orientation of the prior reset positions. In some embodiments, updated haptic contact target mapping overlays may be shown in display 110 to provide a user with additional guidance, analogous to those of FIG. 9 but with position and orientation of the contact guide overlay determined dynamically as described in this paragraph rather than determined statically.

A number of other specific application types may also benefit from one or more of the multi-surface and/or dynamic touch input mechanisms described herein. One example is applications on mobile devices that require more precise control than fingertip touch selection. For example, this type of mobile application may include a photo and/or image editing application, a 2-D or 3-D object maneuvering/posing application, and/or a presentation slides editing tool application.

Another example is graphical game applications on mobile devices. For example, real-time strategy games may often display a lot of relatively small objects on a crowded display screen. The game play often requires selecting, moving, acting, etc. on certain objects on the screen. The Multi-Surface Input system is perfectly suited for these types of precision-demanding in-game operations.

Another example scenario in graphical game is the input to first-person and/or third person shooting or fighting games. Multi-surface input systems may allow inputs from the user to control the shooting and fighting actions to be applied on the back of the computing device, so that the control inputs from the user will not block any view of the user on the front screen, enabling greater information display and a more immersive user experience. Furthermore, multi-surface input mechanisms can provide 2-D and/or 3-D gestures for additional dimensions of input, which, for instance, can be used to control and/or change the viewing perspective of the game, besides controlling the shooting and/or fighting actions.

Yet another example use scenario is typing intensive applications on mobile devices. For example, frequently travelling business people, sales people, marketing people, product-oriented people, entrepreneurs, field technicians and/or field operators, maintenance and/or operation engineering people, workers with lengthy commutes, and others may need to enter a large volume of information on a mobile device via typing, such as while writing emails, sending messages, composing documents, and the like. Multi-surface touch input implementations described herein may enable text input with improved accuracy and efficiency.

Figure 25:
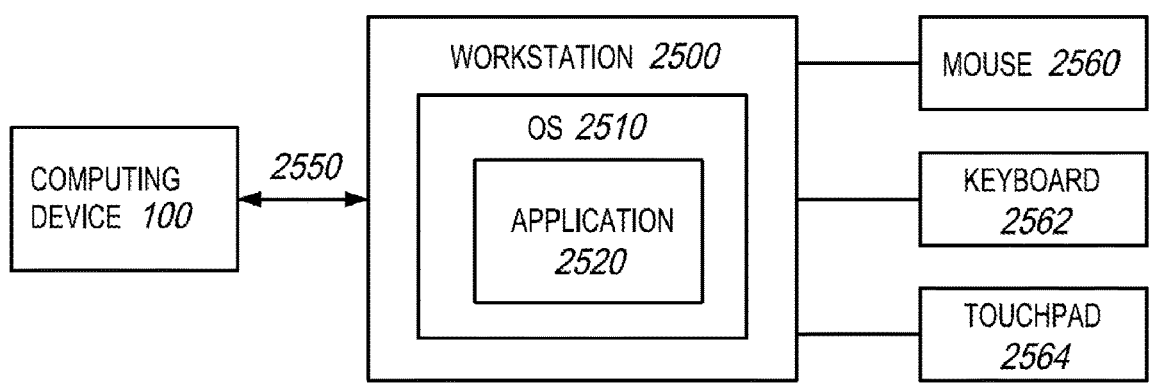
FIG. 25 is a schematic block diagram of the computing device used as a multi-dimensional input device for a separate computing system.

In accordance with yet another use case, a mobile device with multi-surface input capability may be used as a peripheral input device for another computing device. For example, a user of a professional CAD software application on a workstation computer may use a mobile device with multi-surface input functionality as an input device. Such an arrangement is illustrated schematically in FIG. 25. Computing device 100 may exchange information with workstation 2500 via communications link 2550, which may be implemented by, e.g., Bluetooth wireless communications, wireless ethernet, or a cabled data connection. Such information may include, for example, transmission of data characterizing haptic inputs detected by device 100, such as touch input positions and pressure levels on each of multiple touch input sensors 110 and/or 120. Such inputs may be processed by workstation operating system 2510, and conveyed to a software application 2520 for use in application control. Thus, computing device 100 may act, in some circumstances, analogously to a three-dimensional input mouse in creating, editing, and manipulating three-dimensional objects in a drawing, painting or design application. Such inputs may be provided to workstation 2500 in addition to other, conventional control inputs, such as mouse 2560, keyboard 2562 or touch pad 2564.

Similar to such use of a mobile device as a controller peripheral for a separate computing device, concepts described herein in connection with mobile device embodiments, may also be utilized in connection with peripheral controller devices that are not otherwise mobile devices or which do not otherwise provide standalone computing functionality. For example, a controller peripheral with one or more touch-sensitive surfaces may be implemented using the arrangement of FIG. 25, in which communications link 2550 enables interaction between workstation 2500 (or in some embodiments, a gaming system or other type of computing device) and a dedicated controller peripheral device. Such a dedicated controller peripheral may, in some embodiments, be implemented using hardware components substantially similar to mobile device 100, although component specifications may be reduced for cost purposes, including utilization of a front side touch-sensitive surface sensor in lieu of a touch-sensitive display screen 110.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

The invention claimed is:

1. A handheld electronic device comprising:
    a display screen positioned on a front surface of the electronic device;
    a touch sensitive input surface detecting user touch inputs; and
    a microprocessor receiving signals from the touch sensitive input surface indicative of user touch inputs, and driving a visual display on the display screen, the microprocessor configured to:
    implement a plurality of virtual keyboard key contact areas on the touch sensitive input surface that are responsive to user touch inputs, without providing any visual indicia on the display screen indicative of a position associated with each key contact area, each key contact area position corresponding to a portion of the touch sensitive input surface dynamically determined by the electronic device; and
    dynamically adjust the key contact area positions in response to locations on the touch sensitive input surface corresponding to a plurality of touch input, in which the microprocessor is further configured to:
    detect a plurality of simultaneous touch inputs on the touch sensitive input surface; and
    reset the key contact area positions based on spatial properties of the plurality of simultaneous touch inputs, the spatial properties comprising orientation of the plurality of simultaneous touch inputs relative to one another.

2. The handheld electronic device of claim 1, wherein the spatial properties further comprise distances between the plurality of simultaneous touch inputs.

3. The handheld electronic device of claim 1, wherein the spatial properties further comprise a shape of contact areas associated with the touch input.

4. The handheld electronic device of claim 1, wherein the microprocessor is further configured to, while resetting the key contact area positions, temporarily display on the display screen visual indicia indicative of a position associated with each key contact area.

5. The handheld electronic device of claim 4, wherein the microprocessor is further configured to superimpose said visual indicia over display content on the display screen.

6. The handheld electronic device of claim 1, wherein the touch sensitive input surface is positioned on a back surface of the handheld electronic device.

7. The handheld electronic device of claim 1, wherein the microprocessor is further configured to selectively display on the display screen visual indicia indicative of a position associated with each key contact area.

8. The handheld electronic device of claim 7, wherein said visual indicative are displayed in response to satisfaction of one or more indicia display criteria.

9. A method for an electronic device to implement a virtual keyboard, wherein the electronic device comprises a touch sensitive input surface and one or more display screens, the method comprising:
    providing a plurality of virtual keyboard key contact areas responsive to user touch inputs without providing any visual indicia on the one or more display screens indicative of a position associated with each key contact area, each key contact area position corresponding to a portion of the touch sensitive input surface dynamically determined by the electronic device; and
    dynamically adjusting the key contact area positions in response to locations on the touch sensitive input surface corresponding to a plurality of touch inputs, in which the step of dynamically adjusting the key contact area positions comprises:
    detecting a plurality of simultaneous touch inputs on the touch sensitive input surface; and
    resetting the key contact area positions based on spatial properties of the plurality of simultaneous touch inputs, the spatial properties comprising orientation of the plurality of simultaneous touch inputs relative to one another.

10. The method of claim 9, wherein the spatial properties further comprise distances between the plurality of simultaneous touch inputs.

11. The method of claim 9, wherein the spatial properties further comprise a shape of contact areas associated with the touch inputs.

12. The method of claim 9, in which the step of resetting the key contact area positions comprises temporarily displaying on the one or more display screens visual indicia indicative of a position associated with each key contact area.

13. The method of claim 12, in which the step of temporarily displaying indicia comprises: superimposing said indicia over display content on one or more of said display screens.

14. The method of claim 9, wherein: the electronic device is a handheld electronic device; the touch sensitive input surface is on a back side of the handheld electronic device; and at least one of the display screens is on a front side of the handheld electronic device.

15. The method of claim 9, further comprising the step of: selectively displaying on the one or more display screens visual indicia indicative of a position associated with each key contact area.

16. The method of claim 15, in which the step of selectively displaying visual indicia comprises: triggering display of said indicia in response to satisfaction of one or more indicia display criteria.

* * * * *